(12) United States Patent
Ording et al.

(10) Patent No.: US 10,732,814 B2
(45) Date of Patent: Aug. 4, 2020

(54) SCROLLING LIST WITH FLOATING ADJACENT INDEX SYMBOLS

(71) Applicant: Apple Inc., Cupertino, CA (US)

(72) Inventors: Bas Ording, San Francisco, CA (US); Stephen O. Lemay, Palo Alto, CA (US); Gregory N. Christie, San Jose, CA (US); Imran Chaudhri, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 911 days.

(21) Appl. No.: 15/167,532

(22) Filed: May 27, 2016

(65) Prior Publication Data

US 2016/0274757 A1    Sep. 22, 2016

Related U.S. Application Data

(63) Continuation of application No. 12/891,705, filed on Sep. 27, 2010, now Pat. No. 9,354,803, which is a (Continued)

(51) Int. Cl.
| | | |
|---|---|---|
| *G06F 3/0485* | (2013.01) | |
| *G06F 3/0481* | (2013.01) | |
| *G06F 3/0482* | (2013.01) | |
| *G06F 3/0488* | (2013.01) | |
| *G06F 3/0484* | (2013.01) | |

(52) U.S. Cl.
CPC .......... *G06F 3/0485* (2013.01); *G06F 3/0481* (2013.01); *G06F 3/0482* (2013.01); *G06F 3/0488* (2013.01); *G06F 3/04845* (2013.01); *G06F 3/04883* (2013.01); *G06F 2203/04804* (2013.01); *G06F 2203/04808* (2013.01)

(58) Field of Classification Search
CPC ..... G06F 3/0485; G06F 3/0481; G06F 3/0482
See application file for complete search history.

(56) References Cited

U.S. PATENT DOCUMENTS

| | | |
|---|---|---|
| 4,837,798 A | 6/1989 | Cohen et al. |
| 4,935,954 A | 6/1990 | Thompson et al. |
| | (Continued) | |

FOREIGN PATENT DOCUMENTS

| | | |
|---|---|---|
| AU | 2007100826 A4 | 9/2007 |
| AU | 2008100011 A4 | 2/2008 |
| | (Continued) | |

OTHER PUBLICATIONS

Intention to Grant received for European Patent Application No. 10176624.4, dated Feb. 9, 2017, 9 pages.
(Continued)

*Primary Examiner* — Amy Ng
*Assistant Examiner* — David Tan
(74) *Attorney, Agent, or Firm* — Dentons US LLP

(57) ABSTRACT

Movement of a user's point of contact with a touch-sensitive display is determined. In response to the movement, a list of information items on the touch-sensitive display is scrolled. The list of information items may include a sequence of information item subsets corresponding to a sequence of index items. While scrolling through respective information subsets, an index symbol is displayed in conjunction with each respective information item subset.

21 Claims, 19 Drawing Sheets

Related U.S. Application Data continuation of application No. 11/322,547, filed on Dec. 23, 2005, now Pat. No. 7,958,456.

(56) References Cited

U.S. PATENT DOCUMENTS

| | | |
|---|---|---|
| 4,972,462 A | 11/1990 | Shibata |
| 5,003,577 A | 3/1991 | Ertz et al. |
| 5,164,982 A | 11/1992 | Davis |
| 5,202,961 A | 4/1993 | Mills et al. |
| 5,283,818 A | 2/1994 | Klausner et al. |
| 5,333,266 A | 7/1994 | Boaz et al. |
| 5,347,295 A | 9/1994 | Agulnick et al. |
| 5,390,236 A | 2/1995 | Klausner et al. |
| 5,453,725 A | 9/1995 | You et al. |
| 5,463,725 A | 10/1995 | Henckel et al. |
| 5,510,808 A | 4/1996 | Cina, Jr. et al. |
| 5,524,140 A | 6/1996 | Klausner et al. |
| 5,550,559 A | 8/1996 | Isensee et al. |
| 5,559,301 A | 9/1996 | Bryan, Jr. et al. |
| 5,563,996 A | 10/1996 | Tchao |
| 5,568,603 A | 10/1996 | Chen et al. |
| 5,570,109 A | 10/1996 | Jenson |
| 5,572,576 A | 11/1996 | Klausner et al. |
| 5,657,434 A | 8/1997 | Yamamoto et al. |
| 5,745,716 A | 4/1998 | Tchao et al. |
| 5,809,267 A | 9/1998 | Moran et al. |
| 5,825,308 A | 10/1998 | Rosenberg |
| 5,825,355 A | 10/1998 | Palmer et al. |
| 5,835,923 A | 11/1998 | Shibata et al. |
| 5,844,547 A | 12/1998 | Minakuchi et al. |
| 5,859,638 A | 1/1999 | Coleman et al. |
| 5,873,108 A | 2/1999 | Goyal et al. |
| 5,880,411 A | 3/1999 | Gillespie et al. |
| 5,936,623 A | 8/1999 | Amro |
| 5,936,625 A | 8/1999 | Kahl et al. |
| 5,939,134 A | 8/1999 | McKean et al. |
| 5,943,052 A | 8/1999 | Allen et al. |
| 5,963,623 A | 10/1999 | Kim |
| 5,973,676 A | 10/1999 | Kawakura |
| 6,018,372 A * | 1/2000 | Etheredge .......... H04N 5/44543 348/E5.105 |
| 6,073,036 A | 6/2000 | Heikkinen et al. |
| 6,115,037 A | 9/2000 | Sumiyoshi et al. |
| 6,262,724 B1 | 7/2001 | Crow et al. |
| 6,278,443 B1 | 8/2001 | Amro et al. |
| 6,323,846 B1 | 11/2001 | Westerman et al. |
| 6,323,883 B1 | 11/2001 | Minoura et al. |
| 6,335,722 B1 | 1/2002 | Tani et al. |
| 6,337,698 B1 | 1/2002 | Keely, Jr. et al. |
| 6,340,979 B1 | 1/2002 | Beaton et al. |
| 6,342,902 B1 | 1/2002 | Harradine et al. |
| 6,353,442 B1 | 3/2002 | Masui |
| 6,388,877 B1 | 5/2002 | Canova, Jr. et al. |
| 6,430,574 B1 | 8/2002 | Stead |
| 6,462,752 B1 | 10/2002 | Ma et al. |
| 6,469,695 B1 | 10/2002 | White |
| 6,542,171 B1 | 4/2003 | Satou et al. |
| 6,570,557 B1 | 5/2003 | Westerman et al. |
| 6,677,932 B1 | 1/2004 | Westerman |
| 6,677,965 B1 | 1/2004 | Ullmann et al. |
| 6,687,664 B1 | 2/2004 | Sussman et al. |
| 6,690,365 B2 | 2/2004 | Hinckley et al. |
| 6,690,387 B2 | 2/2004 | Zimmerman et al. |
| 6,788,292 B1 | 9/2004 | Nako et al. |
| 6,865,718 B2 | 3/2005 | Levi |
| 6,919,879 B2 | 7/2005 | Griffin et al. |
| 6,922,816 B1 | 7/2005 | Amin et al. |
| 6,954,899 B1 | 10/2005 | Anderson |
| 6,966,037 B2 | 11/2005 | Fredriksson et al. |
| 7,007,239 B1 | 2/2006 | Hawkins et al. |
| 7,030,861 B1 | 4/2006 | Westerman et al. |
| 7,054,965 B2 | 5/2006 | Bell et al. |
| 7,082,163 B2 | 7/2006 | Uenoyama et al. |
| 7,152,210 B1 | 12/2006 | Van Den Hoven et al. |
| 7,173,637 B1 | 2/2007 | Hinckley et al. |
| 7,223,316 B2 | 5/2007 | Murase |
| 7,312,785 B2 | 12/2007 | Tsuk et al. |
| 7,312,790 B2 | 12/2007 | Sato et al. |
| 7,404,152 B2 | 7/2008 | Zinn et al. |
| 7,408,538 B2 | 8/2008 | Hinckley et al. |
| 7,411,575 B2 | 8/2008 | Hill et al. |
| 7,436,395 B2 | 10/2008 | Chiu et al. |
| 7,469,381 B2 | 12/2008 | Ording |
| 7,479,949 B2 | 1/2009 | Jobs et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,694,231 B2 | 4/2010 | Kocienda et al. |
| 7,768,501 B1 | 8/2010 | Maddalozzo, Jr. et al. |
| 7,786,975 B2 | 8/2010 | Ording et al. |
| 7,822,443 B2 | 10/2010 | Kim et al. |
| 7,844,914 B2 | 11/2010 | Andre et al. |
| 7,922,096 B2 | 4/2011 | Eilersen |
| 7,957,762 B2 | 6/2011 | Herz et al. |
| 7,958,456 B2 | 6/2011 | Ording et al. |
| 7,996,792 B2 | 8/2011 | Anzures et al. |
| 8,006,002 B2 | 8/2011 | Kalayjian et al. |
| 8,032,298 B2 | 10/2011 | Han |
| 8,146,019 B2 | 3/2012 | Kim et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,405,621 B2 | 3/2013 | Gehani et al. |
| 8,479,122 B2 | 7/2013 | Hotelling et al. |
| 8,572,513 B2 | 10/2013 | Chaudhri et al. |
| 8,624,933 B2 | 1/2014 | Marr et al. |
| 8,689,128 B2 | 4/2014 | Chaudhri et al. |
| 8,698,762 B2 | 4/2014 | Wagner et al. |
| 8,839,155 B2 | 9/2014 | Ording |
| 8,984,431 B2 | 3/2015 | Chaudhri et al. |
| 8,984,436 B1 * | 3/2015 | Tseng .................. G06F 1/1624 715/786 |
| 9,354,803 B2 | 5/2016 | Ording et al. |
| 9,436,374 B2 | 9/2016 | Marr et al. |
| 2002/0015024 A1 | 2/2002 | Westerman et al. |
| 2002/0030667 A1 | 3/2002 | Hinckley et al. |
| 2002/0077082 A1 | 6/2002 | Cruickshank |
| 2002/0080151 A1 | 6/2002 | Venolia |
| 2002/0089545 A1 | 7/2002 | Levi Montalcini |
| 2002/0118169 A1 | 8/2002 | Hinckley et al. |
| 2002/0122066 A1 | 9/2002 | Bates et al. |
| 2002/0130891 A1 | 9/2002 | Singer |
| 2002/0135602 A1 | 9/2002 | Davis et al. |
| 2002/0137565 A1 | 9/2002 | Blanco |
| 2002/0143741 A1 | 10/2002 | Laiho et al. |
| 2002/0154173 A1 | 10/2002 | Etgen et al. |
| 2002/0186252 A1 | 12/2002 | Himmel et al. |
| 2002/0191029 A1 | 12/2002 | Gillespie et al. |
| 2002/0196238 A1 | 12/2002 | Tsukada et al. |
| 2003/0008679 A1 | 1/2003 | Iwata et al. |
| 2003/0026402 A1 | 2/2003 | Clapper |
| 2003/0043174 A1 | 3/2003 | Hinckley et al. |
| 2003/0076301 A1 | 4/2003 | Tsuk et al. |
| 2003/0076306 A1 | 4/2003 | Zadesky et al. |
| 2003/0095149 A1 | 5/2003 | Fredriksson et al. |
| 2003/0122787 A1 | 7/2003 | Zimmerman et al. |
| 2003/0128192 A1 | 7/2003 | Van Os |
| 2003/0131317 A1 | 7/2003 | Budka et al. |
| 2003/0226152 A1 | 12/2003 | Billmaier et al. |
| 2003/0228863 A1 | 12/2003 | Vander Veen et al. |
| 2004/0023643 A1 | 2/2004 | Vander Veen et al. |
| 2004/0026605 A1 | 2/2004 | Lee et al. |
| 2004/0027371 A1 | 2/2004 | Jaeger |
| 2004/0100479 A1 | 5/2004 | Nakano et al. |
| 2004/0125088 A1 | 7/2004 | Zimmerman et al. |
| 2004/0143796 A1 | 7/2004 | Lerner et al. |
| 2004/0189714 A1 | 9/2004 | Fox et al. |
| 2004/0252109 A1 | 12/2004 | Trent et al. |
| 2005/0012723 A1 | 1/2005 | Pallakoff |
| 2005/0020317 A1 | 1/2005 | Koyama |
| 2005/0024345 A1 | 2/2005 | Eastty et al. |
| 2005/0071437 A1 | 3/2005 | Bear et al. |

(56) References Cited

U.S. PATENT DOCUMENTS

| | | |
|---|---|---|
| 2005/0071761 A1 | 3/2005 | Kontio |
| 2005/0097468 A1 | 5/2005 | Montalcini |
| 2005/0134578 A1 | 6/2005 | Chambers et al. |
| 2005/0146534 A1 | 7/2005 | Fong et al. |
| 2005/0177445 A1 | 8/2005 | Church |
| 2005/0190059 A1 | 9/2005 | Wehrenberg |
| 2005/0210403 A1 | 9/2005 | Satanek |
| 2005/0216839 A1 | 9/2005 | Salvucci |
| 2006/0001652 A1 | 1/2006 | Chiu et al. |
| 2006/0007174 A1 | 1/2006 | Shen |
| 2006/0010400 A1 | 1/2006 | Dehlin et al. |
| 2006/0015819 A1 | 1/2006 | Hawkins et al. |
| 2006/0017692 A1 | 1/2006 | Wehrenberg et al. |
| 2006/0018446 A1 | 1/2006 | Schmandt et al. |
| 2006/0026356 A1 | 2/2006 | Okawa et al. |
| 2006/0026521 A1* | 2/2006 | Hotelling ............ G06F 3/0418 715/702 |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0036942 A1 | 2/2006 | Carter |
| 2006/0038785 A1 | 2/2006 | Hinckley et al. |
| 2006/0038796 A1 | 2/2006 | Hinckley et al. |
| 2006/0161846 A1 | 7/2006 | Van Leeuwen |
| 2006/0184901 A1 | 8/2006 | Dietz |
| 2006/0197753 A1 | 9/2006 | Hotelling |
| 2006/0234680 A1 | 10/2006 | Doulton |
| 2006/0236262 A1 | 10/2006 | Bathiche et al. |
| 2006/0239419 A1 | 10/2006 | Joseph et al. |
| 2006/0253547 A1 | 11/2006 | Wood et al. |
| 2006/0265263 A1 | 11/2006 | Burns |
| 2006/0268020 A1 | 11/2006 | Han |
| 2006/0277504 A1* | 12/2006 | Zinn ................ G06F 3/0482 715/864 |
| 2006/0290666 A1 | 12/2006 | Crohas |
| 2007/0002018 A1 | 1/2007 | Mori |
| 2007/0038953 A1 | 2/2007 | Keohane et al. |
| 2007/0080936 A1 | 4/2007 | Tsuk et al. |
| 2007/0129059 A1 | 6/2007 | Nadarajah et al. |
| 2007/0132789 A1 | 6/2007 | Ording et al. |
| 2007/0146337 A1 | 6/2007 | Ording et al. |
| 2007/0150830 A1 | 6/2007 | Ording et al. |
| 2007/0150842 A1 | 6/2007 | Chaudhri et al. |
| 2007/0152980 A1 | 7/2007 | Kocienda et al. |
| 2007/0168413 A1 | 7/2007 | Barletta et al. |
| 2007/0180375 A1 | 8/2007 | Gittelman et al. |
| 2007/0192744 A1 | 8/2007 | Reponen |
| 2007/0198111 A1 | 8/2007 | Oetzel et al. |
| 2007/0220442 A1 | 9/2007 | Bohan et al. |
| 2007/0220443 A1 | 9/2007 | Cranfill et al. |
| 2008/0016468 A1 | 1/2008 | Chambers et al. |
| 2008/0027637 A1 | 1/2008 | Sakano |
| 2008/0033779 A1 | 2/2008 | Coffman et al. |
| 2008/0034289 A1 | 2/2008 | Doepke et al. |
| 2008/0037951 A1 | 2/2008 | Cho et al. |
| 2008/0040692 A1 | 2/2008 | Sunday et al. |
| 2008/0042984 A1 | 2/2008 | Lim et al. |
| 2008/0055257 A1 | 3/2008 | Peng |
| 2008/0055264 A1 | 3/2008 | Anzures et al. |
| 2008/0056459 A1 | 3/2008 | Vallier et al. |
| 2008/0071810 A1 | 3/2008 | Casto et al. |
| 2008/0075368 A1 | 3/2008 | Kuzmin |
| 2008/0082939 A1 | 4/2008 | Nash et al. |
| 2008/0084399 A1 | 4/2008 | Chua et al. |
| 2008/0084400 A1 | 4/2008 | Rosenberg |
| 2008/0126933 A1 | 5/2008 | Gupta et al. |
| 2008/0155417 A1 | 6/2008 | Vallone et al. |
| 2008/0158170 A1 | 7/2008 | Herz et al. |
| 2008/0163131 A1 | 7/2008 | Hirai et al. |
| 2008/0163161 A1 | 7/2008 | Shaburov et al. |
| 2008/0165141 A1 | 7/2008 | Christie |
| 2008/0165151 A1 | 7/2008 | Lemay et al. |
| 2008/0168384 A1 | 7/2008 | Platzer et al. |
| 2008/0168395 A1 | 7/2008 | Ording et al. |
| 2008/0190266 A1 | 8/2008 | Kim et al. |
| 2008/0207176 A1 | 8/2008 | Brackbill et al. |
| 2008/0211785 A1 | 9/2008 | Hotelling et al. |
| 2008/0222546 A1 | 9/2008 | Mudd et al. |
| 2008/0259040 A1 | 10/2008 | Ording et al. |
| 2008/0278455 A1 | 11/2008 | Atkins et al. |
| 2008/0320391 A1 | 12/2008 | Lemay et al. |
| 2009/0006958 A1 | 1/2009 | Pohjola et al. |
| 2009/0058822 A1 | 3/2009 | Chaudhri |
| 2009/0075694 A1 | 3/2009 | Kim et al. |
| 2009/0077491 A1 | 3/2009 | Kim et al. |
| 2009/0128500 A1 | 5/2009 | Sinclair |
| 2009/0144623 A1 | 6/2009 | Jung |
| 2009/0158149 A1 | 6/2009 | Ko |
| 2009/0160804 A1 | 6/2009 | Chang et al. |
| 2009/0174667 A1 | 7/2009 | Kocienda et al. |
| 2009/0174677 A1 | 7/2009 | Gehani et al. |
| 2009/0174680 A1 | 7/2009 | Anzures et al. |
| 2009/0178008 A1 | 7/2009 | Herz et al. |
| 2009/0199119 A1 | 8/2009 | Park et al. |
| 2009/0228792 A1 | 9/2009 | Van Os et al. |
| 2009/0322695 A1 | 12/2009 | Cho et al. |
| 2010/0013780 A1 | 1/2010 | Ikeda et al. |
| 2010/0013782 A1 | 1/2010 | Liu et al. |
| 2010/0042933 A1 | 2/2010 | Ragusa |
| 2010/0058228 A1 | 3/2010 | Park et al. |
| 2010/0060586 A1 | 3/2010 | Pisula et al. |
| 2010/0085379 A1 | 4/2010 | Hishikawa et al. |
| 2010/0125785 A1 | 5/2010 | Moore et al. |
| 2010/0134425 A1 | 6/2010 | Storrusten |
| 2010/0162181 A1 | 6/2010 | Shiplacoff et al. |
| 2010/0175018 A1 | 7/2010 | Petschnigg et al. |
| 2010/0231534 A1 | 9/2010 | Chaudhri et al. |
| 2010/0231535 A1 | 9/2010 | Chaudhri et al. |
| 2010/0231536 A1 | 9/2010 | Chaudhri et al. |
| 2010/0231537 A1 | 9/2010 | Pisula et al. |
| 2011/0050594 A1 | 3/2011 | Kim et al. |
| 2011/0074699 A1 | 3/2011 | Marr et al. |
| 2011/0163967 A1 | 7/2011 | Chaudhri |
| 2011/0163971 A1 | 7/2011 | Wagner et al. |
| 2015/0020021 A1 | 1/2015 | Marr et al. |
| 2015/0113479 A1 | 4/2015 | Ording |
| 2015/0277564 A1* | 10/2015 | Saito ................ G06F 3/0485 715/702 |
| 2016/0274757 A1 | 9/2016 | Ording et al. |

FOREIGN PATENT DOCUMENTS

| | | |
|---|---|---|
| CN | 1475962 A | 2/2004 |
| CN | 1613049 A | 5/2005 |
| CN | 1673939 A | 9/2005 |
| CN | 101315593 A | 12/2008 |
| DE | 19621593 A1 | 12/1997 |
| DE | 29824936 U1 | 7/2003 |
| DE | 102004029203 A1 | 12/2005 |
| EP | 679005 A1 | 10/1995 |
| EP | 684543 A1 | 11/1995 |
| EP | 713187 A2 | 5/1996 |
| EP | 795811 A1 | 9/1997 |
| EP | 880091 A2 | 11/1998 |
| EP | 961199 A1 | 12/1999 |
| EP | 994409 A2 | 4/2000 |
| EP | 1058181 A1 | 12/2000 |
| EP | 1615109 A2 | 1/2006 |
| EP | 1727032 A2 | 11/2006 |
| EP | 1942401 A1 | 7/2008 |
| EP | 2409214 A1 | 1/2012 |
| EP | 2420925 A2 | 2/2012 |
| JP | 8-166783 A | 6/1996 |
| JP | 2001-202176 A | 7/2001 |
| JP | 2003-052019 A | 2/2003 |
| JP | 2004-192573 A | 7/2004 |
| JP | 2005-124224 A | 5/2005 |
| JP | 2006-295753 A | 10/2006 |
| JP | 2008-026439 A | 2/2008 |
| JP | 2009-017486 A | 1/2009 |
| JP | 2005-044036 A | 1/2012 |
| KR | 2002-0069952 A | 9/2002 |
| KR | 2003-0088374 A | 11/2003 |
| KR | 2004-0015427 A | 2/2004 |

(56) References Cited

FOREIGN PATENT DOCUMENTS

| KR | 2004-0075062 A | 8/2004 |
|---|---|---|
| KR | 2005-0072071 A | 7/2005 |
| KR | 2007-0101893 A | 10/2007 |
| WO | 93/20640 A1 | 10/1993 |
| WO | 94/17469 A1 | 8/1994 |
| WO | 99/16181 A1 | 4/1999 |
| WO | 2000/36496 A1 | 6/2000 |
| WO | 00/63766 A1 | 10/2000 |
| WO | 01/02949 A1 | 1/2001 |
| WO | 01/29702 A2 | 4/2001 |
| WO | 2004/111816 A2 | 12/2004 |
| WO | 2005/010725 A2 | 2/2005 |
| WO | 2005/067511 A2 | 7/2005 |
| WO | 2006/020304 A2 | 2/2006 |
| WO | 2006/020305 A2 | 2/2006 |
| WO | 2010/107661 A1 | 9/2010 |

OTHER PUBLICATIONS

Notice of Allowance received for Japanese Patent Application No. 2016-017400, dated Dec. 16, 2016, 3 pages (Official Coy Only). {See Communication under 37 CFR § 1.98(a)(3)}.
Final Office Action received for U.S. Appl. No. 12/566,673, dated Aug. 12, 2016, 28 pages.
Notice of Allowance received for U.S. Appl. No. 14/149,727, dated Aug. 4, 2016, 4 pages.
Summons to Attend Oral Proceedings received for European Patent Application No. 10799261.2, dated Jul. 12, 2016, 12 pages.
Examiner's Answer to Appeal Brief received for U.S. Appl. No. 12/566,673, dated Nov. 17, 2017, 10 pages.
Communication Prior to Oral Proceedings received for European Patent Application No. 06846397.5, dated Apr. 18, 2018, 16 pages.
Decision to Grant received for European Patent Application No. 10712824.1, dated May 17, 2018, 3 pages.
"Handbook for Palm™ m500 Series Handhelds", User Manual. Available at: http://www.palm.com:80/us/support/handbooks/tungstent/tungstent_ug.pdf, 2002, 286 pages.
Notice of Allowance received for U.S. Appl. No. 14/149,727, dated Apr. 29, 2016, 7 pages.
Office Action received for European Patent Application No. 06846397.5, dated Jun. 20, 2016, 7 pages.
Office Action received for European Patent Application No. 09162953.5, dated Jun. 20, 2016, 7 pages.
Summon to Attend Oral Proceedings received for European Patent Application No. 10176624.4, dated Jun. 2, 2016, 5 pages.
Office Action Received for European Patent Application No. 06846397.5, dated Oct. 27, 2015, 6 pages.
Office Action Received for European Patent Application No. 09162953.5, dated Oct. 27, 2015, 6 pages.
Notice of Allowance received for Korean Patent Application No. 10-2012-7020511, dated Dec. 23, 2015, 3 pages (1 page English Translation and 2 pages of Official Copy).
Office Action received for Korean Patent Application No. 10-2013-7028487, dated Feb. 18, 2016, 8 pages (4 English Translation and 4 pages of Official Copy).
Notice of allowance received for Korean Patent Application No. 10-2013-7028489, dated Jan. 25, 2016, 5 pages (2 pages of English Translation and 3 pages of Official Copy).
Office Action received for European Patent Application No. 10712824.1, dated Mar. 1, 2016, 11 pages.
Non-Final Office Action received for U.S. Appl. No. 12/566,673, dated Dec. 16, 2015, 23 pages.
Non Final Office Action received for U.S. Appl. No. 14/149,727, dated Jan. 22, 2016, 8 pages.
Non-Final Office Action received for U.S. Appl. No. 14/483,721, dated Apr. 18, 2016, 20 pages.
Office Action received for Chinese Patent Application No. 201080063737.8, dated Mar. 29, 2016, 11 pages (6 pages of English Translation and 5 pages of Official Copy).

Office Action Received for Japanese Patent Application No. 2012500842, dated Jan. 31, 2014, 5 pages (2 pages of Official Copy and 3 pages of English Translation).
Notice of Allowance received for Japanese Patent Application No. 2014-148065, dated Jan. 12, 2016, 6 pages (3 pages English Translation and 3 pages Official copy).
Office Action received for Australian Patent Application No. 2015201237, dated Mar. 4, 2016, 4 pages.
Tidwell, Jenifer, "Animated Transition", from Designing Interfaces, O'Reilly Media, Inc. Available at http://designinginterfaces.com/Animated Transition, Nov. 2005, 2 pages.
Non-Final Office Action received for U.S. Appl. No. 12/566,669, dated Jun. 19, 2012, 30 pages.
International Search Report and Written Opinion received for PCT Patent Application No. PCT/US2008/050083, dated Jul. 4, 2008, 9 pages.
Office Action received for Korean Patent Application No. 10-2013-7028487, dated Jun. 13, 2016, 6 pages (3 pages of English Translation and 3 pages of Official Copy).
Notice of Allowance received for Australian Patent Application No. 2015201237, dated Mar. 2, 2017, 3 pages.
Office Action received for European Patent Application No. 10799261.2 dated Mar. 27, 2017, 31 pages.
Decision to Grant received for European Patent Application No. 10176624.4, dated Jun. 22, 2017, 2 pages.
Intention to Grant received for European Patent Application No. 10712824.1, dated Jan. 5, 2018, 9 pages.
Summons to Attend Oral proceedings received for European Patent Application No. 06846397.5, dated Oct. 25, 2017, 14 pages.
Notice of Allowance received for Korean Patent Application No. 10-2016-7025395, dated Oct. 26, 2016, 5 pages (2 pages of English Translation and 3 pages of Official Copy).
Office Action received for Chinese Patent Application No. 201080063737.8, dated Oct. 20, 2016, 8 pages (2 pages of English translation and 6 pages of Official Copy).
Handbook for Palm™ Tungsten™ T Handhelds, 2002, 290 pages.
Intention to Grant received for European Patent Application No. 06846397.5, dated Sep. 5, 2018, 7 pages.
Minutes of Oral Proceedings received for European Patent Application No. 06846397.5, dated Aug. 31, 2018, 6 pages.
iCal, Wikipedia, the Free Encyclopedia, available at https://web.archive.org/web/20080224154325/http://en.wikipedia.org/wiki/ICal, Feb. 24, 2008, 3 pages.
iCalendar, Wikipedia, the Free Encyclopedia, available at <http://en.wikipedia.org/wiki/lCalendar>, retrieved on Feb. 4, 2008, 7 pages.
Microsoft Outlook 2003 Basic Guide, available athttp://it.med.miami.edu/documents/outlook_2003_guide.pdf, Aug. 15, 2005, 32 pages.
Microsoft Word 2000 Microsoft Corporation, pp. MSWord Figures 1-5, 1999.
Office Action Received for European Patent Application No. 06846397.5, dated Aug. 15, 2013, 6 pages.
Office Action received for European Patent Application No. 06846397.5, dated Jan. 28, 2009, 5 pages.
Office Action received European Patent Application No. 06846477.5, dated Apr. 21, 2009, 6 pages.
Decision of Grant received for European Patent Application No. 07814635.4, dated Nov. 4, 2011, 2 pages.
Office Action Received for European Patent Application No. 07814635.4, dated Feb. 24, 2010, 4 pages.
Office Action received for European Patent Application No. 07814635.4, dated Jun. 30, 2009, 3 pages.
Summons to Attend Oral Proceedings received for European Patent Application No. 07814635.4, dated Nov. 24, 2010, 1 page.
European Search Report received for European Patent Application No. 09162953.5, dated Sep. 2, 2009, 6 pages.
Office Action Received for European Patent Application No. 09162953.5, dated Aug. 15, 2013, 5 pages.
Office Action received for European Patent Application No. 09162953.5, dated Jan. 27, 2010, 6 pages.
European Search Report received for European Patent Application No. 10176624.4, dated Mar. 1, 2013, 7 pages.

(56) References Cited

OTHER PUBLICATIONS

Office Action Received for European Patent Application No. 10176624.4, dated Apr. 23, 2015, 6 pages.
Office Action received for Korean Application No. 10-2008-7016570, dated May 31, 2010, 5 pages.
Office Action received for Korean Patent Application No. 1020087017977, dated May 31, 2010, 7 pages.
Office Action Received for Korean Patent Application No. 10-2009-7007062, dated Feb. 15, 2011, 3 pages.
Office Action Received for Korean Patent Application No. 10-2009-7011991, dated Jan. 5, 2011, 6 pages.
Office Action Received for Korean Patent Application No. 10-2011-7024312, dated Apr. 26, 2013, 4 pages.
Office Action received for Korean Patent Application No. 10-2012-7020511, dated Feb. 25, 2015, 4 pages.
Office Action received for Korean Patent Application No. 10-2012-7020511, dated Jul. 28, 2014, 7 pages.
Office Action Received for Korean Patent Application No. 10-2012-7020511, dated Oct. 8, 2013, 4 pages.
Office Action Received for Korean Patent Application No. 10-2013-7028487, dated Jun. 5, 2015, 9 pages.
Office Action received for Korean Patent Application No. 10-2013-7028489, dated Jun. 4, 2015, 4 pages.
Office Action received for European Patent Application No. 10712824.1, dated Jun. 23, 2014, 7 pages.
Office Action received for European Patent Application No. 10799261.2 dated Feb. 13, 2014, 10 pages.
Advisory Action received for U.S. Appl. No. 11/322,547, dated Aug. 22, 2008, 3 pages.
Final Office Action received for U.S. Appl. No. 11/322,547, dated Jun. 9, 2008, 15 pages.
Final Office Action received for U.S. Appl. No. 11/322,547, dated May 28, 2010, 12 pages.
Non-Final Office Action received for U.S. Appl. No. 11/322,547, dated Aug. 6, 2009, 10 pages.
Non-Final Office Action received for U.S. Appl. No. 11/322,547, dated Feb. 5, 2009, 11 pages.
Non-Final Office Action received for U.S. Appl. No. 11/322,547, dated Oct. 30, 2007, 16 pages.
Notice of Allowance received for U.S. Appl. No. 11/322,547, dated Aug. 6, 2010, 11 pages.
Final Office Action received for U.S. Appl. No. 11/322,551, dated Jun. 15, 2009, 15 pages.
Final Office Action received for U.S. Appl. No. 11/322,551, dated Mar. 12, 2010, 17 pages.
Non-Final Office Action received for U.S. Appl. No. 11/322,551, dated Dec. 18, 2008, 15 pages.
Non-Final Office Action received for U.S. Appl. No. 11/322,551, dated Sep. 22, 2009, 17 pages.
Notice of Allowance received for U.S. Appl. No. 11/322,551, dated Jul. 21, 2010, 7 pages.
Final Office Action received for U.S. Appl. No. 11/322,553, dated Aug. 5, 2008, 25 pages.
Non-Final Office Action received for U.S. Appl. No. 11/322,553, dated Apr. 5, 2010, 18 pages.
Non-Final Office Action received for U.S. Appl. No. 11/322,553, dated Dec. 26, 2008, 26 pages.
Non-Final Office Action received for U.S. Appl. No. 11/322,553, dated Feb. 5, 2008, 11 pages.
Non-Final Office Action received for U.S. Appl. No. 11/322,553, dated Jun. 15, 2007, 16 pages.
Non-Final Office Action received for U.S. Appl. No. 11/322,553, dated Jun. 17, 2009, 27 pages.
Non-Final Office Action received for U.S. Appl. No. 11/770,720, dated Jan. 4, 2011, 11 pages.
Notice of Allowance received for U.S. Appl. No. 11/770,720, dated May 20, 2011, 8 pages.
Final Office Action received for U.S. Appl. No. 11/968,064, dated Jan. 5, 2010, 20 pages.
Non-Final Office Action received for U.S. Appl. No. 11/968,064, dated May 15, 2009, 17 pages.
Final Office Action received for U.S. Appl. No. 11/969,786, dated Jun. 15, 2011, 22 pages.
Final Office Action received for U.S. Appl. No. 11/969,786, dated May 9, 2012, 39 pages.
Non-Final Office Action received for U.S. Appl. No. 11/969,786, dated Dec. 8, 2011, 21 pages.
Non-Final Office Action received for U.S. Appl. No. 11/969,786, dated Feb. 11, 2011, 27 pages.
Office Action Received for German Patent Application No. 112006003309.3, dated Apr. 6, 2011, 5 pages.
Office Action received for German Patent Application No. 112006003309.3, dated Sep. 8, 2009, 8 pages.
Office Action received for German Patent Application No. 112006003505.3, dated Oct. 14, 2009, 9 pages.
Office Action Received for German Patent Application No. 112006004220.3, dated Apr. 6, 2011, 5 pages.
Office Action Received for German Patent Application No. 112007002090.3, dated Jun. 7, 2010, 8 pages.
Non-Final Office Action received for U.S. Appl. No. 12/240,974, dated Oct. 5, 2011, 36 pages.
Notice of Allowance received for U.S. Appl. No. 12/240,974, dated Dec. 11, 2012, 2 pages.
Notice of Allowance received for U.S. Appl. No. 12/240,974, dated May 3, 2012, 12 pages.
Notice of Allowance received for U.S. Appl. No. 12/240,974, dated Oct. 19, 2012, 12 pages.
Final Office Action received for U.S. Appl. No. 12/566,638, dated Nov. 21, 2012, 16 pages.
Non-Final Office Action received for U.S. Appl. No. 12/566,638, dated Oct. 2, 2013, 21 pages.
Non-Final Office Action received for U.S. Appl. No. 12/566,638, dated May 7, 2012, 15 pages.
Non-Final Office Action received for U.S. Appl. No. 12/566,638, dated Sep. 23, 2011, 16 pages.
Notice of Allowance received for U.S. Appl. No. 12/566,638, dated May 7, 2014, 8 pages.
Final Office Action received for U.S. Appl. No. 12/566,669, dated Nov. 23, 2012, 29 pages.
Non-Final Office Action received for U.S. Appl. No. 12/566,669, dated Apr. 17, 2014, 27 pages.
Notice of Allowance received for U.S. Appl. No. 12/566,669, dated Nov. 6, 2014, 12 pages.
Final Office Action received for U.S. Appl. No. 12/566,671, dated Dec. 20, 2012, 15 pages.
Non-Final Office Action received for U.S. Appl. No. 12/566,671, dated May 23, 2012, 21 pages.
Notice of Allowance received for U.S. Appl. No. 12/566,671, dated Apr. 12, 2013, 11 pages.
Notice of Allowance received for U.S. Appl. No. 12/566,671, dated Dec. 18, 2013, 13 pages.
Non-Final Office Action received for U.S. Appl. No. 12/566,672, dated Nov. 8, 2012, 11 pages.
Notice of Allowance received for U.S. Appl. No. 12/566,672, dated Jun. 24, 2013, 8 pages.
Notice of Allowance received for U.S. Appl. No. 12/566,672, dated Mar. 1, 2013, 7 pages.
Advisory Action received for U.S. Appl. No. 12/566,673, dated Jun. 12, 2013, 3 pages.
Final Office Action received for U.S. Appl. No. 12/566,673, dated Jan. 17, 2013, 22 pages.
Final Office Action received for U.S. Appl. No. 12/566,673, dated Mar. 25, 2014, 19 pages.
Non-Final Office Action received for U.S. Appl. No. 12/566,673, dated Jun. 7, 2012, 17 pages.
Non-Final Office Action received for U.S. Appl. No. 12/566,673, dated Mar. 26, 2015, 19 pages.
Non-Final Office Action received for U.S. Appl. No. 12/566,673, dated Sep. 13, 2013, 18 pages.
Non-Final Office Action received for U.S. Appl. No. 12/567,717, dated Oct. 22, 2012, 11 pages.

(56) References Cited

OTHER PUBLICATIONS

Notice of Allowance received for U.S. Appl. No. 12/567,717, dated Aug. 28, 2013, 10 pages.
Notice of Allowance received for U.S. Appl. No. 12/567,717, dated May 2, 2013, 17 pages.
Final Office Action received for U.S. Appl. No. 12/788,279, dated Apr. 9, 2013, 15 pages.
Final Office Action received for U.S. Appl. No. 12/788,279, dated Jul. 10, 2014, 16 pages.
Non Final Office Action received for U.S. Appl. No. 12/788,279, dated Feb. 12, 2014, 16 pages.
Non-Final Office Action received for U.S. Appl. No. 12/788,279, dated Sep. 27, 2012, 19 pages.
Office Action received for Canadian Patent Application No. 2,661,856, dated Feb. 6, 2013, 2 pages.
Office Action Received for Canadian Patent Application No. 2,661,856, dated Feb. 6, 2012, 2 pages.
Notice of Acceptance received for Australian Patent Application No. 2006321681, dated Sep. 14, 2010, 1 page.
Office Action received for Australian patent application No. 2006321681, dated Dec. 23, 2009, 2 pages.
Office Action received for Australian patent application No. 2006321681, dated Sep. 1, 2009, 2 pages.
Office Action Received for Chinese Patent Application No. 200680052109.3, dated Nov. 9, 2010, 8 pages.
Office Action Received for Chinese Patent Application No. 200680052109.3, dated May 5, 2011, 9 pages.
Office Action Received for Chinese Patent Application No. 200680052109.3, dated Jan. 10, 2012, 17 pages.
Office Action received for Chinese Patent Application No. 200680052109.3, dated Jan. 8, 2010, 6 pages.
Office Action received for Chinese Application No. 200680052778.0, dated Aug. 11, 2010, 9 pages.
Office Action received for Chinese Patent Application No. 200680052778.0, dated Jan. 8, 2010, 19 pages.
Office Action Received for Australian Patent Application No. 2007292473, dated Feb. 17, 2010, 1 page.
Office Action Received for Chinese Patent Application No. 200780040362.1, dated Jul. 21, 2011, 19 pages.
Office Action Received for Chinese Patent Application No. 200780040362.1, dated Oct. 25, 2010, 18 pages.
Office Action Received for Japanese Patent Application No. 2009-527504, dated Feb. 12, 2013, 3 pages.
Office Action Received for Japanese Patent Application No. 2009-527504, dated Jun. 6, 2011, 4 pages.
Notice of Allowance received for Chinese Patent Application No. 201010292415.2, dated Feb. 28, 2014, 2 pages.
Office Action Received for Chinese Patent Application No. 201010292415.2, dated Apr. 23, 2012, 9 pages.
Office Action Received for Chinese Patent Application No. 201010292415.2, dated Mar. 4, 2013, 12 pages.
Office Action Received for Chinese Patent Application No. 201010292415.2, dated Oct. 31, 2013, 8 pages.
Office Action Received for Chinese Patent Application No. 201010516160.3, dated May 6, 2011, 10 pages.
Office Action received for Australian Patent Application No. 2010339638, dated Jun. 14, 2013, 4 pages.
Office Action received for Australian Patent Application No. 2010339638, dated Jun. 26, 2014, 4 pages.
Office Action received for Chinese Patent Application No. 201080063737.8, dated Apr. 18, 2014, 16 pages.
Office Action received for Chinese Patent Application No. 201080063737.8, dated Dec. 11, 2014, 9 pages.
Office Action received for Chinese Patent Application No. 201080063737.8, dated Jul. 23, 2015, 9 pages.
Notice of Allowance received for Japanese Patent Application No. 2012-500842, dated Jun. 20, 2014, 3 pages.
Office Action Received for Japanese Patent Application No. 2012-500842, dated Jun. 18, 2013, 5 pages.

Office Action received for Japanese Patent Application No. 2014-148065, dated Sep. 7, 2015, 5 pages.
Ahlberg, et al., "The Alphaslider: A Compact and Rapid Selector, CHI '94 Proceedings of the SIGCHI Conference on Human Factors in Computing Systems", Apr. 24-28, 1994, pp. 365-371.
Al-Baker, Asri, "AquaCalendar, a Review by i-Symbian.Com", available at http://www.i-symbian.com/forum/articles.php?action=viewarticle&artid=40, 2005, 11 pages.
Aliakseyeu, et al., "Multi-flick: An Evaluation of Flick-Based Scrolling Techniques for Pen Interfaces", CHI 2008, Florence, Italy, Apr. 5-10, 2008, 10 pages.
Apitz et al., "CrossY: A crossing-Based Drawing Application", UIST, vol. 6, No. 2, Oct. 24-27, 2004, pp. 3-12.
Apple Computer, Inc., Slider Programming Topics for Cocoa, Apple Computer, Inc., Oct. 10, 2006, 16 pages.
Arar, Yardena, "Microsoft Reveals Office 2003 Prices", Release, PC World, http://www.pcworld.com/article/112077/microsoft_reveals_office_2003_prices_release.html, Aug. 19, 2003, 3 pages.
Arons, Barry Michael., "The Audio-Graphical Interface to a Personal Integrated Telecommunications System, Thesis Submitted to the Department of Architecture at the Massachusetts Institute of Technology", Jun. 1984, 88 pages.
Bederson, Benjamin B., Fisheye Menus, "Human-Computer Interaction Lab, Institute for Advanced Computer Studies, Computer Science Department, University of Maryland, College Park, ACM 2000, CHI Letters vol. 2, No. 2,", 2000, pp. 217-225.
Coleman, David W., "Meridian Mail Voice Mail System Integrates Voice Processing and Personal Computing", Speech Technology, vol. 4, No. 2, Mar./Apr. 1988, pp. 84-87.
Concept Phones, "Apple Tablet", Concept Phones.com, available at http://www.concept-phones.com/?s=apple+tablet, Dec. 16, 2009, 21 pages.
Esato, "A Couple of My Mates. Meet JasJar and K-Jam (Many Pics)", available at <http://www.esato.com/archive/t.php/t-106524>, retrieved on Apr. 13, 2006, 90 pages.
Gears, Leigh, "Orange SPV C600 Review", Available at <http://www.coolsmartphone.com/article569.html>, retrieved on Apr. 14, 2006, 57 pages.
Gizmodo, "Hand-on Nook Review by Gizmodo: Great all-around ebook reader", e-bookvine ebookMag on Tumblr, downloaded from the internet Dec. 20, 2009, http://e-bookvine.tumblr.com/post/273014247/hand-on-nook-review-by-gizmodo-great-all-around-ebook, Retrieved on Mar. 5, 2015, 3 pages.
Google Calendar, Available at <http://en.wikipedia.org/w/index.php?title=Google_Calendar&printable=yes>, retrieved on May 3, 2015, 6 pages.
Google Calendar Tour, available at <http://www.google.com/intl/en/googlecalendar/tour.html>, retrieved on Jun. 3, 2008, 10 pages.
GSMArena Team, "Sony Ericsson P990 Review: A Coveted Smartphone", available at http://web.archive.org/web/20061227185520/http://www.gsmarena.com/sony_ericsson_P990-review-101p8.php, Aug. 4, 2006, 3 pages.
Haller, "Circular Slider 1.3: A reusable Cocoa control", Stick Software, Available at: http://www.sticksoftware.com/software/CircularSiider.html., Apr. 2002, 3 pages.
Haller, "SSCircularSlider", Stick Software, Available online at: http://www.sticksoftware.com/software/CircularSlider/doc.html, Aug. 29, 2002, 11 Pages.
Hinckley, et al., "Quantitative Analysis of Scrolling Techniques", CHI 2002 Conf. on Human Factors in Computing Systems, CHI Letters, vol. 4, No. 1, 2002, pp. 65-72.
Hurst, et al., "An Elastic Audio Slider for Interactive Speech Skimming", "NordiCHl '04 Proceedings of the third Nordic conference on Human-computer interaction", Oct. 26-27, 2004, 4 pages.
Hurst, "Audio-Visual Data Skimming for E-Learning Applications", HCL 2005 Proceedings, vol. 2, Jul. 22-27, 2005, 4 Pages.
Hurst, "Forward and Backward Speech Skimming with the Elastic Audio Slider", HCL 2005 Proceedings, Jul. 22-27, 2005, 16 pages.
Hurst, "Interactive Manipulation of Replay Speed While Listening to Speech Recordings", Multimedia '04 Proceedings of the 12th annual ACM international conference on Multimedia, New York, New York, Oct. 10-16, 2004, 4 Pages.

(56) References Cited

OTHER PUBLICATIONS

Karlson, et al., "AppLens and LaunchTile: Two Designs for One-Handed Thumb Use on Small Devices", CHI 2005, Papers: Small Devices 1, Apr. 2-7, 2005, pp. 201-210.
Karlson, et al., "AppLens and LaunchTile: Two Designs for One-Handed Thumb Use on Small Devices", Powerpoint Presentation, CHI 2005, 17 pages.
Kazez, Ben, "iCal Events", available at <http://www.benkazez.com/icalevents.php>, retrieved on Mar. 17, 2008, 2 pages.
Masui, et al., "Elastic Graphical Interfaces for Precise Data Manipulation", ACM Conference on Human Factors in Computing Systems (CHI '95), Conference Companion, Apr. 1995, pp. 143-144.
Microsoft Outlook Calendar, Available at http://emedia.leeward.hawaii.edu/teachtech/documents/Personal_Manage/MSOutlook_Cal.pdf, May 3, 2012, 9 pages.
Microsoft Corporation, "Microsoft Office Word 2003 (SP2)", Microsoft Corporation, SP3 as of 2005, pp. MSWord 2003 Figures 1-5, 1983-2003.
Miller, Dana, "PersonalJava Application Environment", available at http://java.sun.com/products/personaljava/touchable/, Jun. 8, 1999, 12 pages.
Myers, Brad A., "Shortcutter for Palm", available at <http://www.cs.cmu.edu/~pebbles/v5/shortcutter/palm/index.html>, retrieved on Jun. 18, 2014, 10 pages.
NextWindow's Multi-Touch Overview, v1.2, 2007, pp. 1-7. 2007.
Northern Telecom, "Meridian Mail PC User Guide", 1988, 17 Pages.
International Preliminary Report on Patentability received for PCT Patent Application No. PCT/US2006/061333, issued on Jun. 24, 2008, 10 pages.
International Search Report and Written Opinion received for PCT Patent Application No. PCT/US2006/061333, dated Nov. 22, 2007, 12 pages.
International Preliminary Report on Patentability received for PCT Patent Application No. PCT/US2006/061337, dated Jun. 11, 2008, 6 pages.
International Search Report and Written Opinion received for PCT Patent Application No. PCT/US2006/061337, dated Feb. 15, 2008, 7 pages.
International Preliminary Report on Patentability received for PCT Patent Application No. PCT/US2006/061627, completed on May 15, 2012, 6 pages.
International Search Report and Written Opinion received for PCT Patent Application No. PCT/US2006/061627, dated Apr. 26, 2007, 8 pages.
International Preliminary Report on Patentability received for PCT Patent Application No. PCT/US2007/077443, dated Mar. 10, 2009, 6 pages.
International Search Report and Written Opinion received for PCT Patent Application No. PCT/US2007/077443, dated Feb. 21, 2008, 8 pages.
International Preliminary Report on Patentability received for PCT Patent Application No. PCT/US2008/050083, dated Jul. 7, 2009, 7 pages.
International Preliminary Report on Patentability received for PCT Patent Application No. PCT/US2008/050423, dated Jul. 7, 2009, 11 pages.
International Search Report and Written Opinion received for PCT Patent Application No. PCT/US2008/050423, dated Sep. 1, 2008, 15 pages.
Invitation to Pay Additional Fees received for PCT Patent Application No. PCT/US2008/050423, dated Jun. 23, 2008, 11 pages.
International Preliminary Report on Patentability received for PCT Patent Application No. PCT/US2008/086538, dated Jul. 6, 2010, 12 pages.
International Search Report and Written Opinion received for PCT Patent Application No. PCT/US2008/086538, dated Jun. 2, 2009, 14 pages.
International Preliminary Report on Patentability received for PCT Patent Application No. PCT/US2010/027088, dated Sep. 29, 2011, 14 pages.
International Search Report and Written Opinion received for PCT Patent Application No. PCT/US2010/027088, dated Jun. 18, 2010, 8 pages.
International Preliminary Report on Patentability received for PCT Patent Application No. PCT/US2010/048443, dated Mar. 27, 2012, 5 pages.
International Search Report and Written Opinion received for PCT Patent Application No. PCT/US2010/048443, dated Nov. 15, 2010, 7 pages.
International Preliminary Report on Patentability received for PCT Patent Application No. PCT/US2010/062319, dated Jul. 19, 2012, 11 pages.
International Search Report and Written Opinion received for PCT Patent Application No. PCT/US2010/062319, dated May 11, 2011, 12 pages.
Potala Software, "My Time!", Available at http://web.archive.org/web/20060615204517/potalasoftware.com/Products/MyTime/Default.aspx, Jun. 2006, 2 pages.
Potala Software, "Potala Telly", Available online at: http://web.archive.org/web/20051019000340/www.potalasoftware.com/telly.asgx, Oct. 19, 2005, pp. 1-6.
Ramos, "Zliding: Fluid Zooming and Sliding for High Precision Parameter Manipulation", "Proceedings of the 18th annual ACM Symposium on User Interface Software and Technology," Oct. 2005, pp. 143-152.
Rekimoto et al., "SmartSkin: An Infrastructure for Freehand Manipulation on Interactive Surfaces", Proceedings of the SIGCHI conference on Human factors in computing systems, vol. 4, Issue 1, Apr. 25, 2002, pp. 113-120.
Roth et al., "Bezel Swipe: Conflict-Free Scrolling and Multiple Selection on Mobile Touch Screen Devices", Proceedings of the 27th International conference on Human Factors in Computing Systems, Boston, MA, CHI 2009, Apr. 4-9, 2009, pp. 1523-1526.
Schmandt et al., "A Conversational Telephone Messaging System", IEEE Transactions on Consumer Electronics, vol. CE-30, Aug. 1984, pp. xxi-xxiv.
Schmandt et al., "Phone Slave: A Graphical Telecommunications Interface", Proceedings of the SID, vol. 26, No. 1, 1985, pp. 79-82.
Schmandt et al., "Phone Slave: A Graphical Telecommunications Interface", Society for Information Display, International Symposium Digest of Technical Papers, Jun. 1984, 4 pages.
Shizuki et al., "Laser Pointer Interaction Techniques using Peripheral Areas of Screens", AVI'06, May 23-26, 2006, 4 pages.
Smith, Rush, "Sygic. Mobile Contacts V1.0", Available online at: http://www.pocketnow.com/index.php?a=portaldetail&id=467, Sep. 2, 2004, 13 pages.
Tidwell, Jenifer, "Animated Transition", Designing Interfaces, Patterns for effective Interaction Design, First Edition, Nov. 2005, 4 pages.
Aqua (user interface), Wikipedia, the free encyclopedia, Available Online at: http://en.wikipedia.org/wiki/Aqua (user interface), Nov. 18, 2009, 8 pages.
Final Office Action received for U.S. Appl. No. 12/891,705, dated Jun. 27, 2013, 12 pages.
Final Office Action received for U.S. Appl. No. 12/891,705, dated Oct. 23, 2014, 32 pages.
Non Final Office Action received for U.S. Appl. No. 12/891,705, dated Jun. 4, 2015, 33 pages.
Non-Final Office Action received for U.S. Appl. No. 12/891,705, dated Mar. 13, 2013, 11 pages.
Non-Final Office Action received for U.S. Appl. No. 12/891,705, dated Mar. 31, 2014, 23 pages.
Notice of Allowance received for U.S. Appl. No. 12/891,705, dated Feb. 3, 2016, 6 pages.
Decision to Grant received for European Patent Application No. 06846397.5, dated Jan. 24, 2019, 2 pages.
Intention to Grant received for European Patent Application No. 09162953.5, dated Mar. 19, 2019, 7 pages.

(56) References Cited

OTHER PUBLICATIONS

Decision to Grant received for European Patent Application No. 09162953.5, dated Aug. 1, 2019, 2 pages.

* cited by examiner

SCROLLING LIST WITH FLOATING ADJACENT INDEX SYMBOLS

RELATED APPLICATIONS

This application is a continuation of U.S. patent application Ser. No. 12/891,705 filed Sep. 27, 2010, entitled "Scrolling List with Floating Adjacent Index Symbols," which is a continuation of U.S. patent application Ser. No. 11/322,547, filed Dec. 23, 2005, entitled "Scrolling List with Floating Adjacent Index Symbols," both applications incorporated by reference herein in their entirety.

This application is related to U.S. patent application Ser. No. 11/322,551, filed Dec. 3, 2005, entitled "Continuous Scrolling List With Acceleration," which application is incorporated by reference herein in its entirety.

This application is related to U.S. patent application Ser. No. 11/322,553, filed Dec. 23, 2005, entitled "List Scrolling in Response to Moving Contact Over List of Index Symbols," which application is incorporated by reference herein in its entirety.

FIELD OF THE INVENTION

The present invention relates generally to user interfaces that include employ touch-sensitive displays, and more specifically to user interfaces having lists that may be scrolled through.

BACKGROUND

The utility, ease of use, and ultimately, popularity of many electronic devices, including portable devices such as cellular telephones, is often gated by industrial design, including the user interface. The user interface is the gateway through which users receive not only content but also responses to user actions or behaviors, including user attempts to access a device's features or tools. As such, the user interface is integral to an overall user experience.

Unfortunately, there are limitations associated with existing user interfaces, especially the user interfaces for small, handheld devices. Existing user interfaces are often complicated. For example, the user interfaces of many mobile phones require a user to traverse a complex tree structure of menus to access device features and content. In addition, existing user interfaces are often counterintuitive, requiring a user to either read instructions in a manual or to engage in frustrating trial and error attempts to locate device features or content. As a consequence, attempts to add additional functionality to such devices are often hampered by the complexity of the user interface.

There is a need therefore, for improved user interfaces for devices, and particularly for small, handheld devices.

SUMMARY

Movement of a user's point of contact with a touch-sensitive display is determined. In response to the movement, a list of information items on the touch-sensitive display is scrolled. The list of information items may include a sequence of information item subsets corresponding to a sequence of index items. While scrolling through respective information subsets, an index symbol is displayed in conjunction with each respective information item subset.

The scrolling may be in accordance with a simulation of an equation of motion having friction.

The index symbol corresponding to a respective information subset may be translucently displayed over the respective information item subset. The translucently displayed index symbol may have a different font color than that used to display text in the information item subset. The translucently displayed index symbol may be displayed using a larger font than the font used to display text in the information item subset. The index symbol may be displayed in a banner. The banner may be displayed at or near the top of the display.

In some embodiments, the index symbol may be displayed adjacent to the displayed text of the information item subset. In some embodiments, the index symbol may be displayed at an upper edge of a window containing the displayed text of the information item subset when scrolling in a predefined direction through the list of information items.

In some embodiments, when the list of information items contains no items for a particular index symbol, a first index symbol preceding a particular index symbol and a second index symbol following the index symbol are displayed in conjunction with scrolling through the list of information items from the information subset corresponding to the first index symbol to the information subset corresponding to the second index symbol. The particular index symbol may not be displayed in conjunction with the displayed text of the list of information items during the scrolling. In some embodiments, display of a respective index symbol is skipped when the list of information items contains no items for the particular index symbol.

The aforementioned methods may be performed by a portable electronic device having a touch-sensitive display with a graphical user interface (GUI), a processor, memory and one or more programs or sets of instructions stored in the memory for performing these methods. In some embodiments, the portable electronic device provides a plurality of functions, including wireless communication.

Instructions for performing the aforementioned methods may be included in a computer program product configured for execution by one or more processors.

BRIEF DESCRIPTION OF THE DRAWINGS

For a better understanding of the invention, reference should be made to the following Description of Embodiments taken in conjunction with the accompanying drawings, in which.

Like reference numerals refer to corresponding parts throughout the drawings.

DESCRIPTION OF EMBODIMENTS

Figure 1:
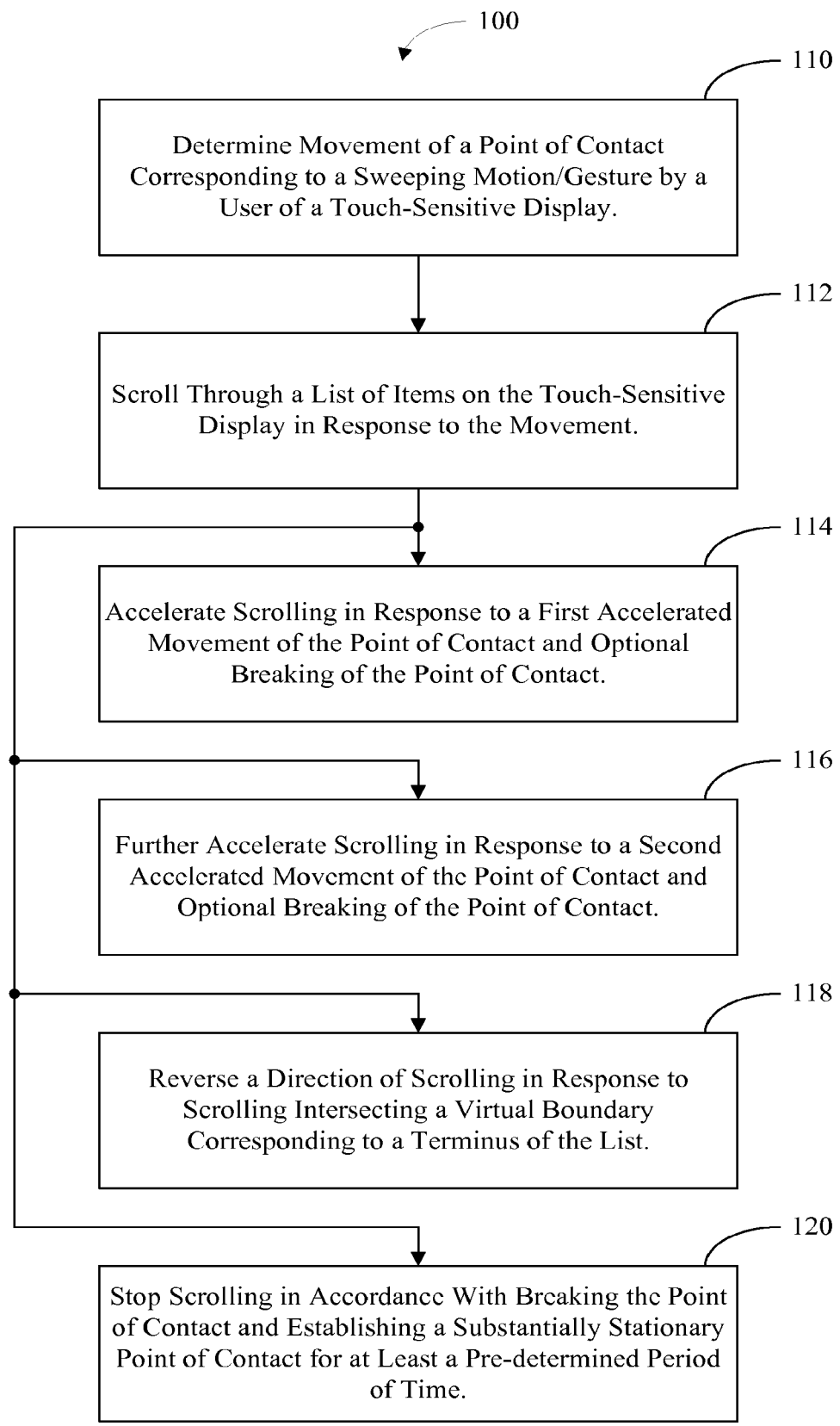
FIG. 1 is a flow diagram illustrating an embodiment of a method of scrolling through a list.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Embodiments of a portable device having a user interface are described. The portable device may be a handheld computer, a tablet computer, a personal digital assistant, a cellular telephone and/or a combination of two or more of these items. The portable device includes a touch-sensitive display. The display may be sensitive to haptic and/or tactile contact with a user. In an exemplary embodiment, a point of contact between the touch-sensitive display and the user corresponds to one or more digits of the user. In other embodiments, the point of contact may correspond to a stylus. The touch-sensitive display may use LCD (liquid crystal display) technology, or LPD (light emitting polymer display) technology, although other display technologies may be used in other embodiments. The touch-sensitive display may furthermore include proximity sensor arrays or other elements for determining one or more points of contact with the touch-sensitive display. The touch-sensitive display is analogous to the multi-touch sensitive tablets described in the following U.S. Patents: U.S. Pat. No. 3,323,846 (Westerman et al.), U.S. Pat. No. 6,570,557 (Westerman et al), and/or U.S. Pat. No. 6,677,932 (Westerman), and/or U.S. Patent Publication 2002/0015024A1, each of which is hereby incorporated by reference. However, the touch-sensitive display displays visual output from the portable device, whereas the touch sensitive tablets do not provide visual output.

The touch-sensitive display may include a GUI with one or more windows. The one or more windows may be used to display a list of items or information items. In an exemplary embodiment, the list of items may include contact information, such as names, addresses, photographs, and/or telephone numbers, for a plurality of individuals (sometimes referred to as a user's contact list or address book). In response to a determined movement of the point of contact, the list may be scrolled. Determining movement of the point of contact may include determining speed (magnitude), velocity (magnitude and direction), and/or an acceleration (including magnitude and/or direction) of the point of contact. Scrolling through the list may be accelerated in response to an accelerated movement of the point of contact. In some embodiments, the scrolling and acceleration of the scrolling may be in accordance with a simulation of a physical device having friction, i.e., damped motion. For example, the scrolling may correspond to a simulation of a force law or equation of motion having a mass or inertial term, as well as a dissipative term. In some embodiments, the simulation may correspond to a cylinder rotating about its axis.

In some embodiments, accelerated movement of the point of contact may include an accelerated movement of the point of contact followed by a breaking of the point of contact. For example, the user may make contact with the touch-sensitive display, swipe or sweep one or more of his or her fingers along the display (i.e., move and/or accelerate the point of contact), and optionally, break the point of contact with the display, i.e., move the one or more fingers away from the display. The swipe or sweep may be along a predefined axis of the touch-sensitive display. In other embodiments, the accelerated movement of the point of contact may include a first user gesture oriented along a predefined axis of the touch-sensitive display.

Scrolling through the list of items may be further accelerated in response to a second sweeping motion of the point of contact along the predefined axis of the touch-sensitive display and/or a second user gesture oriented along the predefined axis of the touch-sensitive display. For example, the user may swipe one or more of his or her fingers along the touch-sensitive display two or more times.

The scrolling through the list of items may be stopped in accordance with the user breaking the point of contact and then establishing a substantially stationary point of contact with the touch-sensitive display for at least a pre-determined period of time. For example, after swiping one or more of his or her fingers along the touch-sensitive display and breaking the point of contact, the user may touch the display and hold the one or more fingers that are touching the display stationary (or approximately stationary) for one or more seconds, or fractions of a second.

The direction of scrolling through the list of items may be reversed in response to the scrolling intersecting a virtual boundary corresponding to a terminus of the list. The scrolling reversal may correspond to a damped motion. For example, during scrolling, a displayed portion of the list of items may appear to bounce off of a boundary of the window in the touch-sensitive display when a beginning or an end of the list of items is reached. The apparent bounce may correspond to a simulation of a viscous or elastic ball having momentum in a first direction striking an immovable and/or inelastic object, such as a wall. The subsequent motion of the ball may be damped, for example, by including a friction or dissipative term in the simulation. A parameter corresponding to the friction term in the simulation may be adjustable, allowing the ball to reach equilibrium in contact with the wall, i.e., the virtual boundary, or displaced from the wall.

As described below with reference to FIGS. 8-11, in some embodiments movement of the point of contact by the user over an index on the touch-sensitive display may be determined. In some embodiments, the index may be displayed in a first region or a first window of the touch-sensitive display while the list of items or information items during the scrolling may be displayed in a second region or a second window of the touch-sensitive display. The displayed index may have a sequence of index items. In an exemplary embodiment, the sequence of index items may include letters in the alphabet, i.e., the index may include an alphabetical index. The list of information items may include an alphabetically ordered list of information items. The alphabetically ordered list of information items may include contact information, for example, in a user's contact list or address book.

In response to movement of the user's point of contact over a displayed index, the list of information items on the touch-sensitive display may be scrolled. The list of information items may include a sequence of information item subsets corresponding to the sequence of index items. The subsets may include one or more categories. For example, a respective category may include contact information for one or more individuals whose first and/or last names begin with one or more respective letters, such as the letter 's'. In an exemplary embodiment, there is a subset corresponding to each letter in the alphabet that has one or more entries. In some embodiments, the scrolling may be in accordance with a simulation of an equation of motion having friction.

The scrolling may include scrolling through a respective information item subset if the point of contact moves over a corresponding respective index item in the index items. The scrolling may have an associated scroll speed based on a speed of movement of the point of contact over the respective index item and the number of items in the information item subset corresponding to the respective index item. For example, the scroll speed may be faster for subsets that have more entries than subsets with fewer entries. The scrolling may include scrolling through all items in a plurality of the information item subsets in response to the point of contact moving over the corresponding index items in the displayed index.

If it is determined that the point of contact with the index corresponds to a respective index item in the index, the list of information items may be scrolled to a corresponding subset of the list of information items. For example, if the user selects an index item, such as the letter 'R', in the set of index symbols, the list of items may be smoothly scrolled to the corresponding subset for the letter 'R' in the list of items. Alternatively, the displayed list of information items jump directly from a current scroll position to a scroll position in which information items corresponding to the index item 'R' are displayed.

If the point of contact with the touch-sensitive display corresponds to a user selection of a respective information item in the list of information items, information corresponding to the respective information item may be displayed on the touch-sensitive display. For example, if the user selects a respective name, the corresponding contact information may be displayed.

While scrolling through respective information subsets, an index symbol may displayed in conjunction with each respective information item subset. In some embodiments, respective index symbols may be displayed adjacent to corresponding subsets (such as displayed text) of the list of information items. In some embodiments, a respective index symbol may be displayed at an upper edge of a window containing the displayed text of the respective information item subset.

The index symbol corresponding to a respective information subset may be translucently displayed over the respective information item subset. The translucently displayed index symbol may have a different font color than that used to display text in the information item subset, and/or it may be displayed using a larger font than the font used to display text in the information item subset.

If the list of information items contains no items for a particular index symbol, i.e., no entries for a particular subset, a first index symbol preceding a particular index symbol and a second index symbol following the index symbol may be displayed in conjunction with scrolling through the list of information items from the information subset corresponding to the first index symbol to the information subset corresponding to the second index symbol. The particular index symbol may not be displayed in conjunction with the displayed text of the list of information items during the scroll through. For example, display of a respective index symbol may be skipped when the list of information items contains no items for the particular index symbol.

Attention is now given to embodiments of a method of continuously scrolling a list with acceleration. FIG. 1 is a flow diagram illustrating an embodiment of a method 100 of scrolling through a list. Movement of a point of contact corresponding to a sweeping motion or gesture by a user of a touch-sensitive display is determined (110). For instance, the movement of the point of contact may be in the same direction that the list is to be scrolled. Thus, if the user wants the list to scroll upwards, the user sweeps a finger (or stylus or the like) in contact with and in an upward direction on the touch-sensitive display. Scrolling the list upward will typically scroll the list to later entries in the list, for instance scrolling from items in category "A" to items in category "B". To scroll the list downward, the user sweeps a finger in a downward direction on the touch-sensitive display. In some embodiments, such as a user interface that simulates a rolodex or a list in inverse alphabetical order, an upward movement of a point of contact causes earlier entries in the list to be displayed, whereas a downward movement of the point of contact causes later entries in the list to be displayed. In this description, the terms "upward" and "downward" are directions relative to the top and bottom of a GUI on the touch-sensitive display.

In some embodiments, the list scrolling method described here operates without displaying a scroll bar. The user's sweeping motion on the touch-sensitive display operation may be performed directly on top of the displayed list, and may include a sweeping or gliding motion, in contact with the display's surface, along a path anywhere within a display window in which the list is displayed. While a scroll bar could potentially be displayed in conjunction with the displayed list, the scrolling method described here can be independent of any such scroll bar. If a scroll bar is used, then an upward movement of a point of contact on the scroll bar may cause earlier entries in the list to be displayed, whereas a downward movement of the point of contact on the scroll bar may cause later entries in the list to be displayed.

A list of items on the touch-sensitive display is scrolled in response to the movement (112). One or more of the following operations may occur. In response to a first accelerated movement of the point of contact and optional breaking of the point of contact, the scrolling may accelerate (114). In response to a second accelerated movement of the point of contact and optional breaking of the point of contact, the scrolling may further accelerate (116). A direction of the scrolling may reverse when the scrolling list intersects a virtual boundary corresponding to a terminus of the list (118). For example, when the list is scrolled to its beginning or end, the scrolling list may appear to bounce again at a boundary and reverse direction. After the bounce or scrolling direction reversal, the scrolling may automatically stop so as to leave the first or last item of the list in view on the touch-sensitive display. The scrolling may stop when the user breaks the point of contact (e.g., by lifting his/her finger off the display) and then establishing a substantially stationary point of contact for at least a pre-determined period of time (120). In other embodiments, the method 100 may include fewer operations or additional operations. In addition, two or more operations may be combined and/or an order of the operations may be changed.

In some embodiments, scrolling may be in accordance with a speed of movement of the point of contact. The speed may be a time average of values determined during several time intervals. In an exemplary embodiment, the speed, velocity and/or acceleration may be determined over five time intervals, where a respective time interval corresponds to an inverse of a frame rate, such as 0.0167 s, of a display. In some embodiments, the speed velocity and/or acceleration may be determined even when a variable frame rate is used, such as when one or more frames are skipped or not displayed. In these embodiments, the speed, velocity and/or acceleration may be determined two or more times for the respective time interval and/or may be projected based on values determined in a preceding and/or a subsequent time interval.

In some embodiments, the scrolling after a user optionally breaks the contact may be in accordance with the change in the acceleration and the speed or the velocity in one or more time intervals prior to the breaking of the contact. For example, the velocity $v_f$ of scrolling one or more time intervals after breaking contact may be determined using $$v_f = v_o + a\Delta t,$$

where $v_o$ is a current value of the velocity when the contact is broken, a is a current value of the acceleration when the contact is broken and $\Delta t$ is an elapsed time, such as one time interval. The velocities and/or acceleration in such a calculation may be projected along an axis or direction of the scrolling. In some embodiments, in subsequent time intervals following the determination of the velocity based on the acceleration and/or the velocity in one or more time intervals prior to the breaking of the contact, the velocity of the scrolling may be tapered. For example, in each successive time interval the velocity may be decreased by 5%. When the velocity crosses a lower threshold, it may be set to zero.

Figure 2:
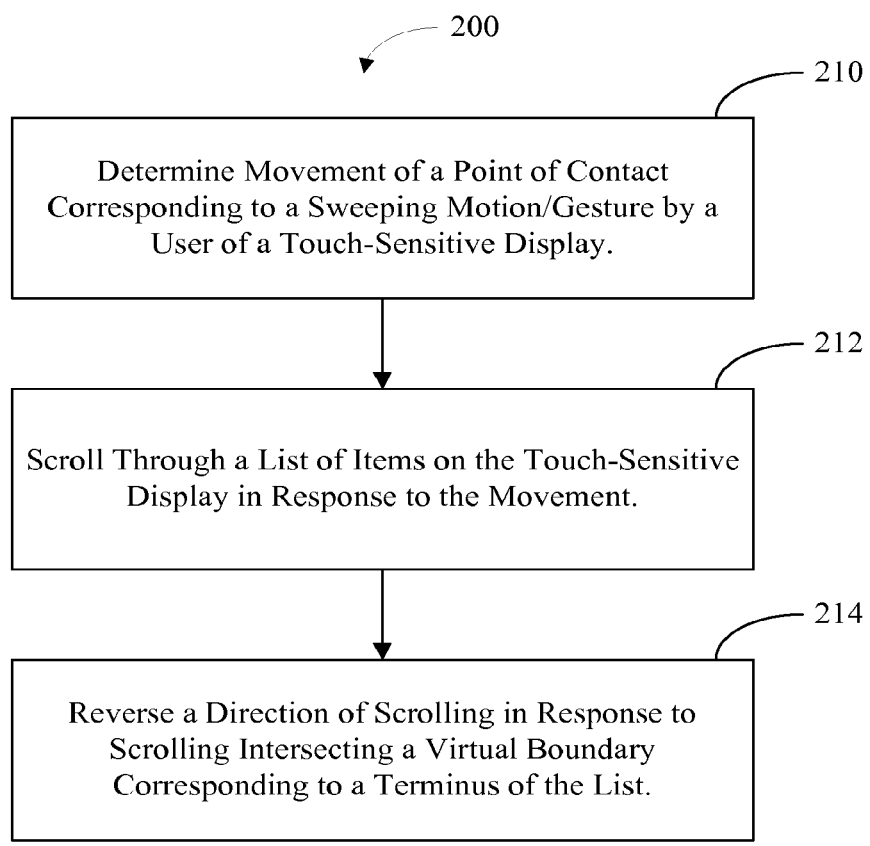
FIG. 2 is a flow diagram illustrating an embodiment of a method of scrolling through a list.

FIG. 2 is a flow diagram illustrating an embodiment of a method 200 of scrolling through a list. Movement of a point of contact corresponding to a sweeping motion or gesture by a user of a touch-sensitive display is determined (208). A determination is made if the movement of the point of contact corresponds to a displacement greater than a pre-determined magnitude (210). A list of items on the touch-sensitive display is scrolled in response to the movement (212). A direction of the scrolling may reverse when the scrolled list intersects a virtual boundary corresponding to a terminus of the list (214). In other embodiments, the method 200 may include fewer operations or additional operations. In addition, two or more operations may be combined and/or an order of the operations may be changed.

Determining if the point of contact corresponds to a displacement greater than the pre-determined value (210) allows small variations, such as less than 0.5, 1 or 2 mm, in the point of contact to occur without scrolling the list of items (212). For example, when the user taps on the touch sensitive screen there may be small, unintentional changes in the point of contact. When the movement corresponds to a displacement greater than the pre-determined magnitude, the scrolling (212) commences smoothly. For example, an offset in the point of contact may be included when scrolling through the list of items. The offset corresponds to the pre-determined magnitude of the displacement. The offset may prevent or reduce an abrupt jump or discontinuity in a displayed image corresponding to the list.

Figure 3:
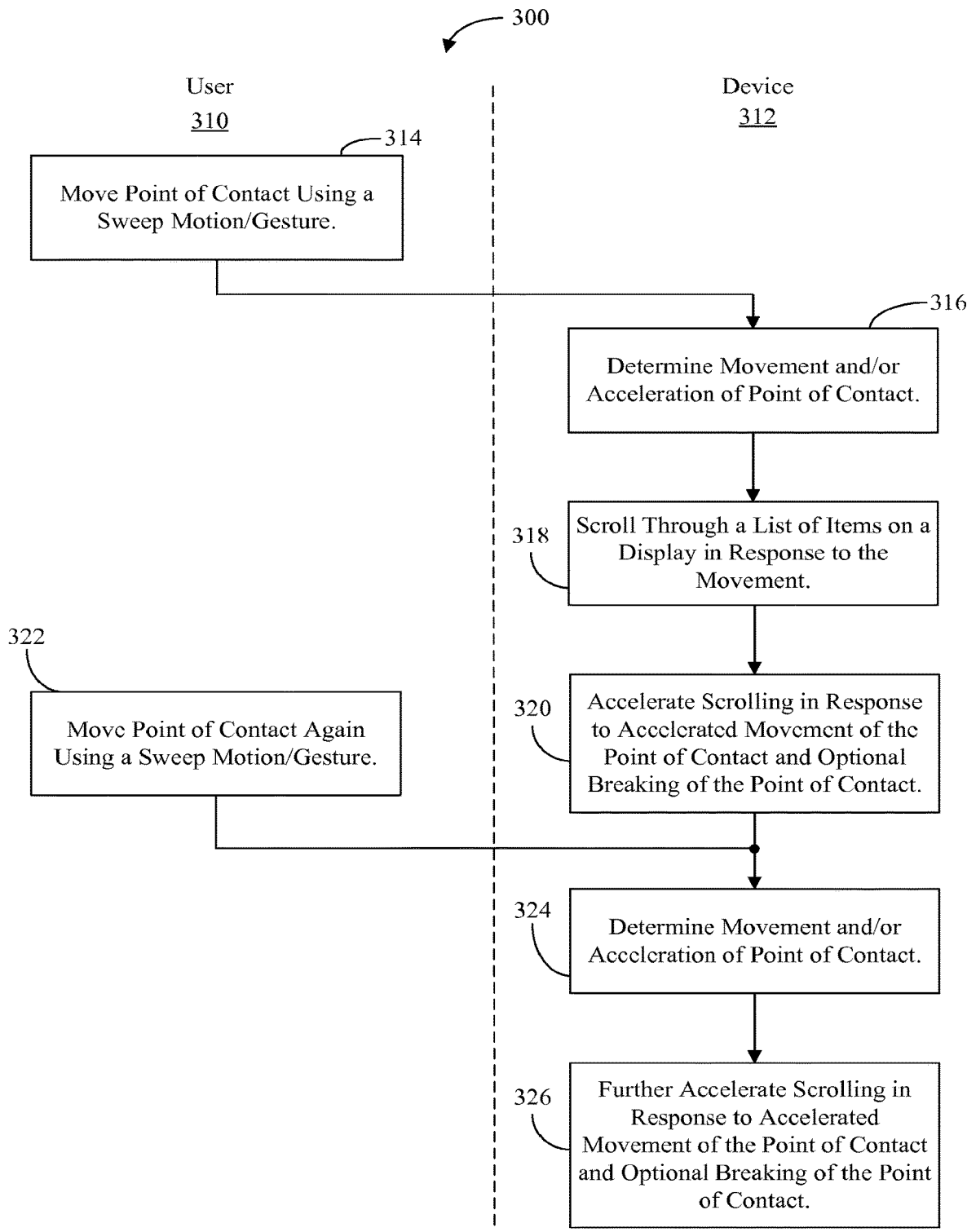
FIG. 3 is a flow diagram illustrating an embodiment of a method of scrolling through a list.

FIG. 3 is a flow diagram illustrating an embodiment of a method 300 of scrolling through a list. A user 310 moves a point of contact using a sweep motion or gesture (314) on the touch-sensitive display of a device. The device 312 determines movement and/or acceleration of the point of contact (316), and scrolls a list of items on its display in response to the movement (318). The device accelerates the scrolling in response to accelerated movement of the point of contact and optional breaking of the point of contact (320). The user 310 may move the point of contact again using the sweep motion/gesture (322). The device 312 again determines movement and/or acceleration of the point of contact (324), and further accelerates the scrolling in response to the accelerated movement of the point of contact and optional breaking of the point of contact (326). In other embodiments, the method 300 may include fewer operations or additional operations. In addition, two or more operations may be combined and/or an order of the operations may be changed.

Figure 4:
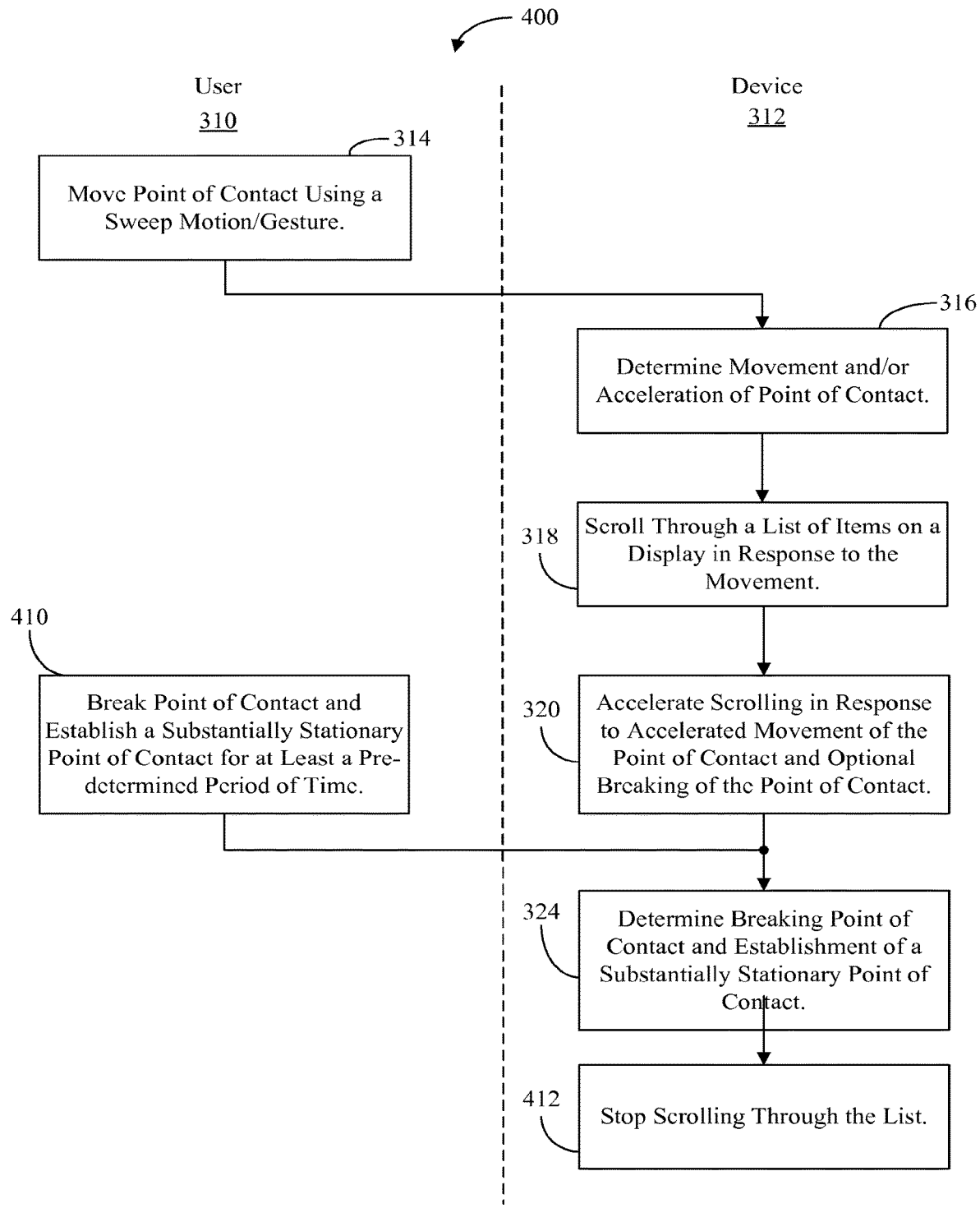
FIG. 4 is a flow diagram illustrating an embodiment of a method of scrolling through a list.

FIG. 4 is a flow diagram illustrating an embodiment of a method 400 of scrolling through a list. A user 310 moves a point of contact using a sweep motion or gesture (314) on the touch-sensitive display of a device. The device 312 determines movement and/or acceleration of the point of contact (316), and scrolls a list of items on its display in response to the movement (318). The device accelerates the scrolling in response to accelerated movement of the point of contact and optional breaking of the point of contact (320). The user 310 may break the point of contact and establish a substantially stationary point of contact for at least a pre-determined period of time (410). The device 312 determines the breaking of the point of contact and the establishment of a substantially stationary point of contact (412), and responds by stopping the scrolling (414). In other embodiments, the method 400 may include fewer operations or additional operations. In addition, two or more operations may be combined and/or an order of the operations may be changed.

Figure 5:
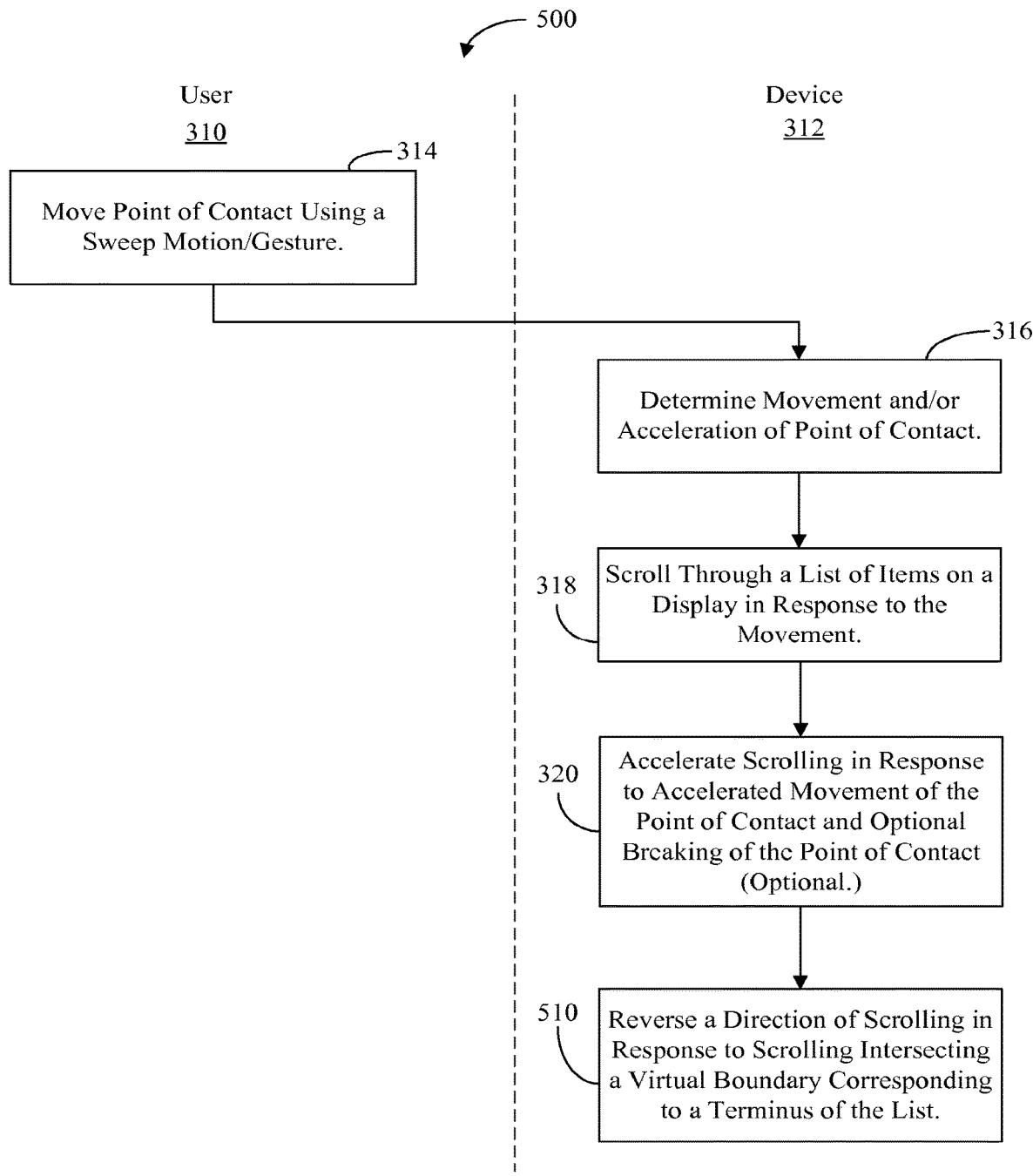
FIG. 5 is a flow diagram illustrating an embodiment of a method of scrolling through a list.

FIG. 5 is a flow diagram illustrating an embodiment of a method 500 of scrolling through a list. Operations 314 through 320 are as described above, and furthermore the accelerated scrolling operation 320 may be skipped when the user does not move a point of contact in an accelerated manner. When the scrolling list intersects a virtual boundary corresponding to a terminus of the list, the direction of scrolling is reversed (510), at least momentarily. In some embodiments, the scrolling reverses and then comes to a stop in a damped fashion when the terminus of the list is reached. In other embodiments, the method 500 may include fewer operations or additional operations. In addition, two or more operations may be combined and/or an order of the operations may be changed.

Figure 6:
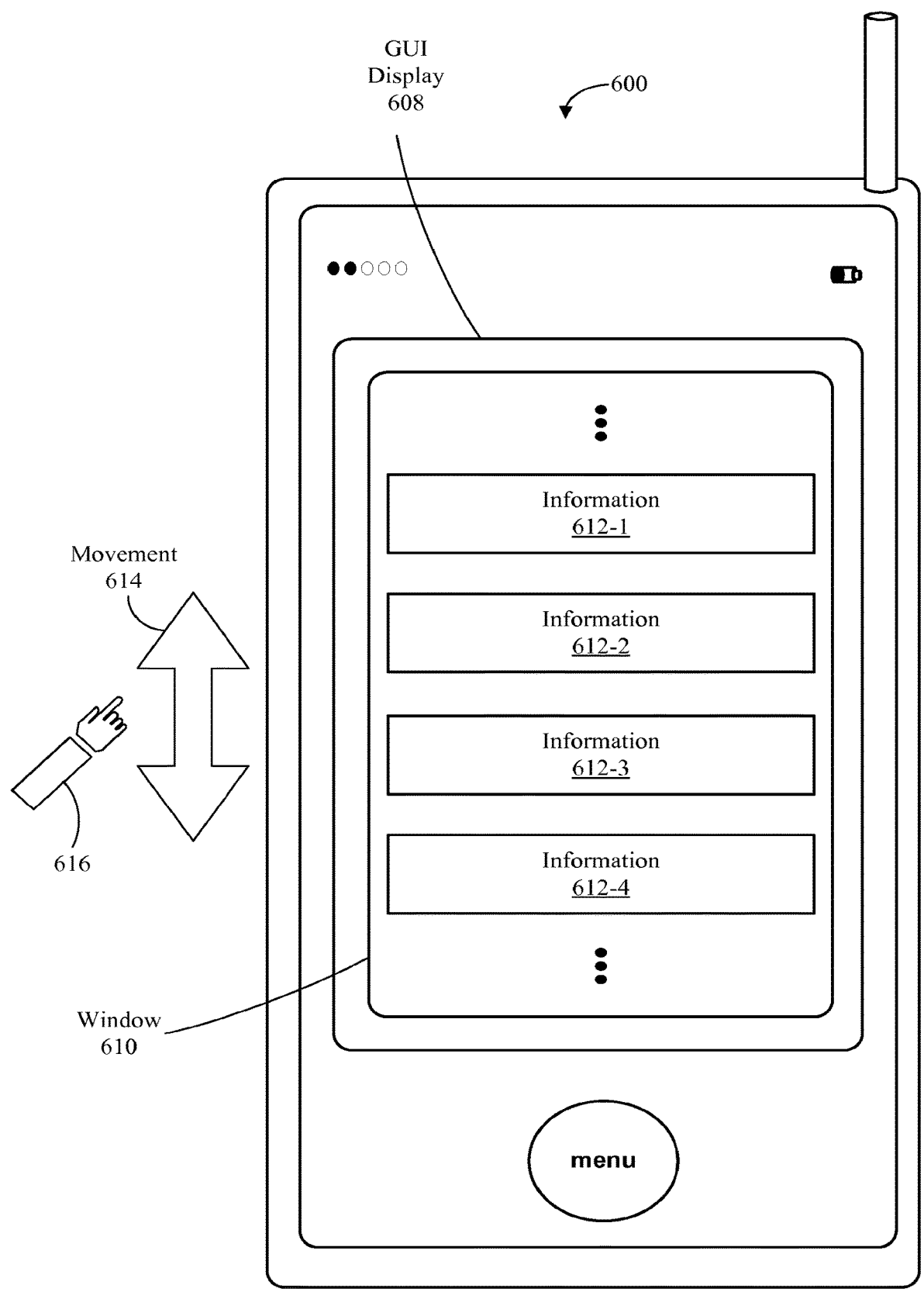
FIG. 6 is a schematic diagram of an embodiment of a user interface of a portable electronic device having a touch-sensitive display.

FIG. 6 is a schematic diagram illustrating an embodiment of a user interface of a portable electronic device 600 having a touch-sensitive display 608. The display 608 may include a window 610. The window 610 may include one or more displayed objects, such as information objects 612-1 to 612-4. In an exemplary embodiment, the information objects 612 may correspond to contact information for one or more individuals in a list of items. The displayed objects may be moved in response to detecting or determining movement 614 of a point of contact with the display, such as that associated with one or more digits 616 of a user (which are not drawn to scale in FIG. 6). In some embodiments, movement of the displayed objects may be accelerated in response to detecting or determining accelerated movement of the point of contact. While embodiment 600 includes one window 610, in other embodiments there may be two or more display windows. In addition, while embodiment 600 illustrates movement 614 in a particular direction. In other embodiments movement of the displayed objects may be in response to movement 614 in one or more other directions, or in response to a scalar (i.e., a determined or detected movement independent of the direction).

Figure 7A:
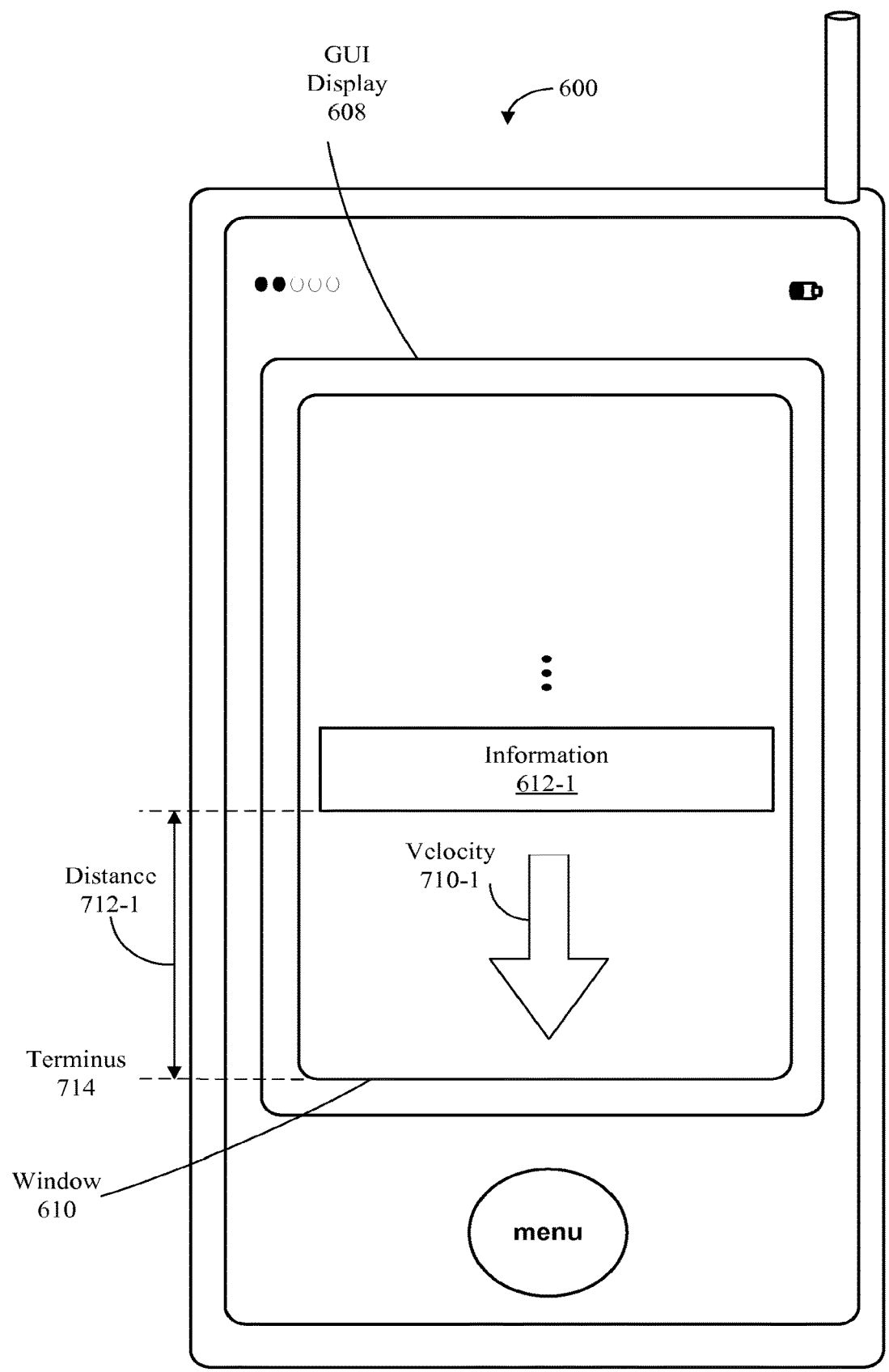
FIG. 7A is a schematic diagram illustrating an embodiment of a user interface of a portable electronic device having a touch-sensitive display.
Figure 7B:
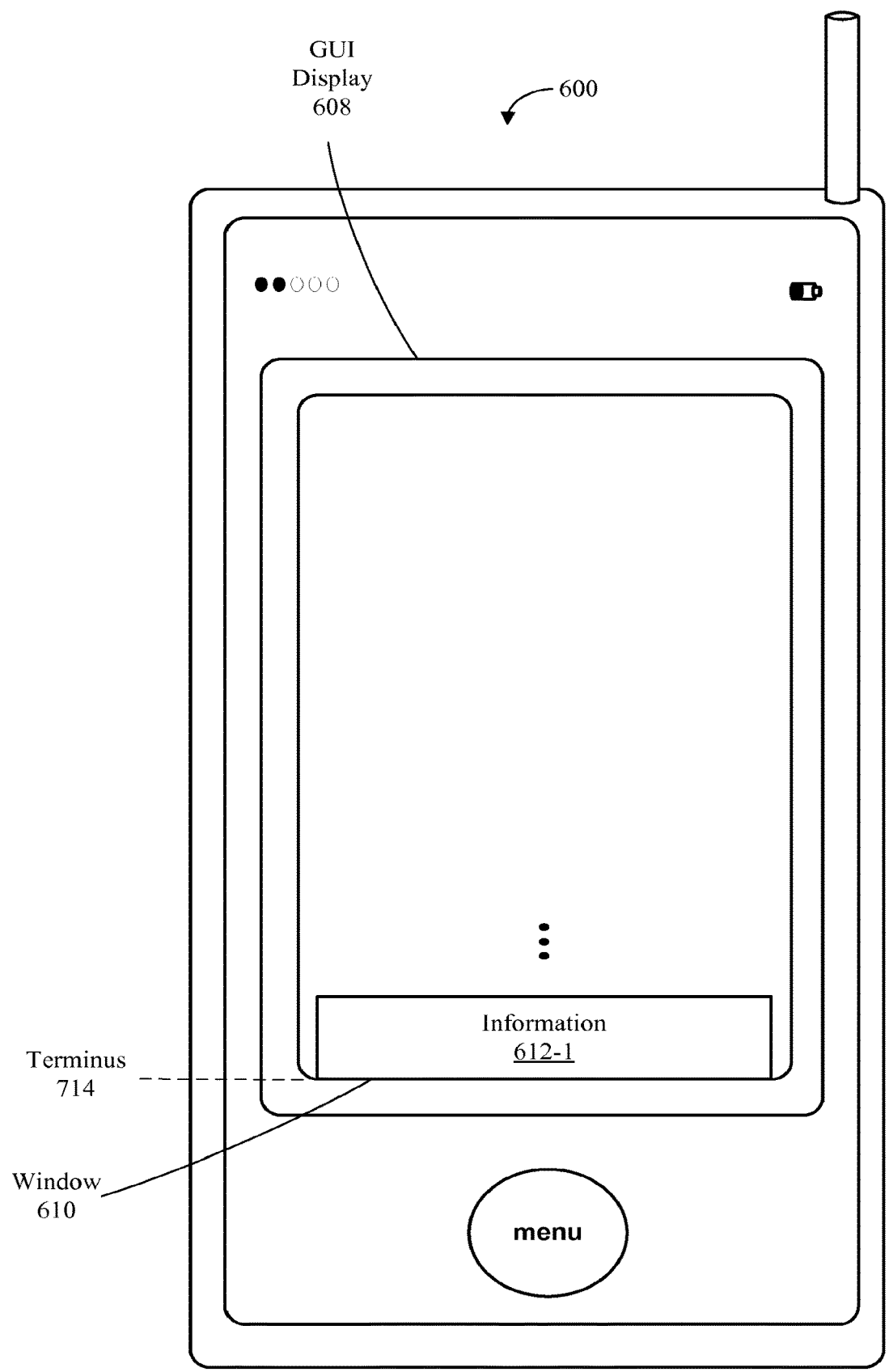
FIG. 7B is a schematic diagram illustrating an embodiment of a user interface of a portable electronic device having a touch-sensitive display.
Figure 7C:
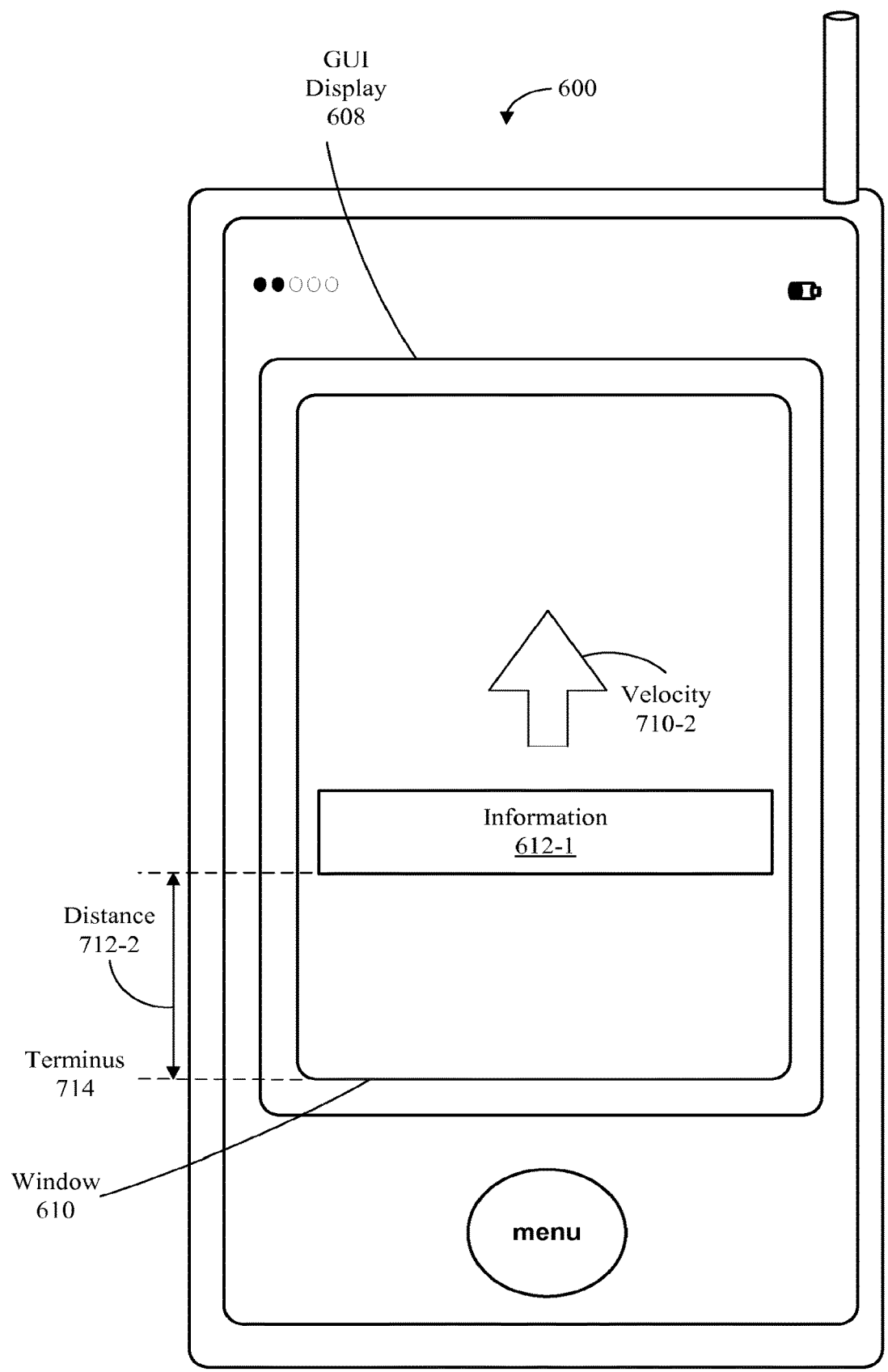
FIG. 7C is a schematic diagram illustrating an embodiment of a user interface of a portable electronic device having a touch-sensitive display.

FIGS. 7A-7B illustrate the scrolling of a list of items to a terminus of the list, at which point one or more displayed items at the end of the list smoothly bounce off the end of the display, reverse direction, and then optionally come to a stop. FIG. 7A is a schematic diagram illustrating an embodiment of a user interface of a portable electronic device 600 having a touch-sensitive display. One or more displayed objects, such as information object 612-1 may be a distance 712-1 from a terminus 714 of the list of items and may be moving with a velocity 710-1 while the list is being scrolled. Note that the terminus 714 is a virtual boundary associated with the displayed objects, as opposed to a physical boundary associated with the window 610 and/or the display 608. As illustrated in FIG. 7B, when the one or more displayed objects, such as the information object 612-1, reach or intersect with the terminus 714, the movement corresponding to the scrolling may stop, i.e., the scrolling velocity may be zero at an instant in time. As illustrated in FIG. 7C, the one or more displayed objects, such as the information 612-1, may subsequently reverse direction. At a time after the intersection with the terminus 714, the information object 612-1 may have velocity 710-2 and may be a distance 712-2 from the terminus 714. In some embodiments, the magnitude of velocity 710-2 may be less than the magnitude of velocity 710-1 when the distance 712-2 equals the distance 712-1, i.e., the motion of the one or more displayed objects is damped after the scrolling list reaches and "bounces" at its terminus.

Figure 8:
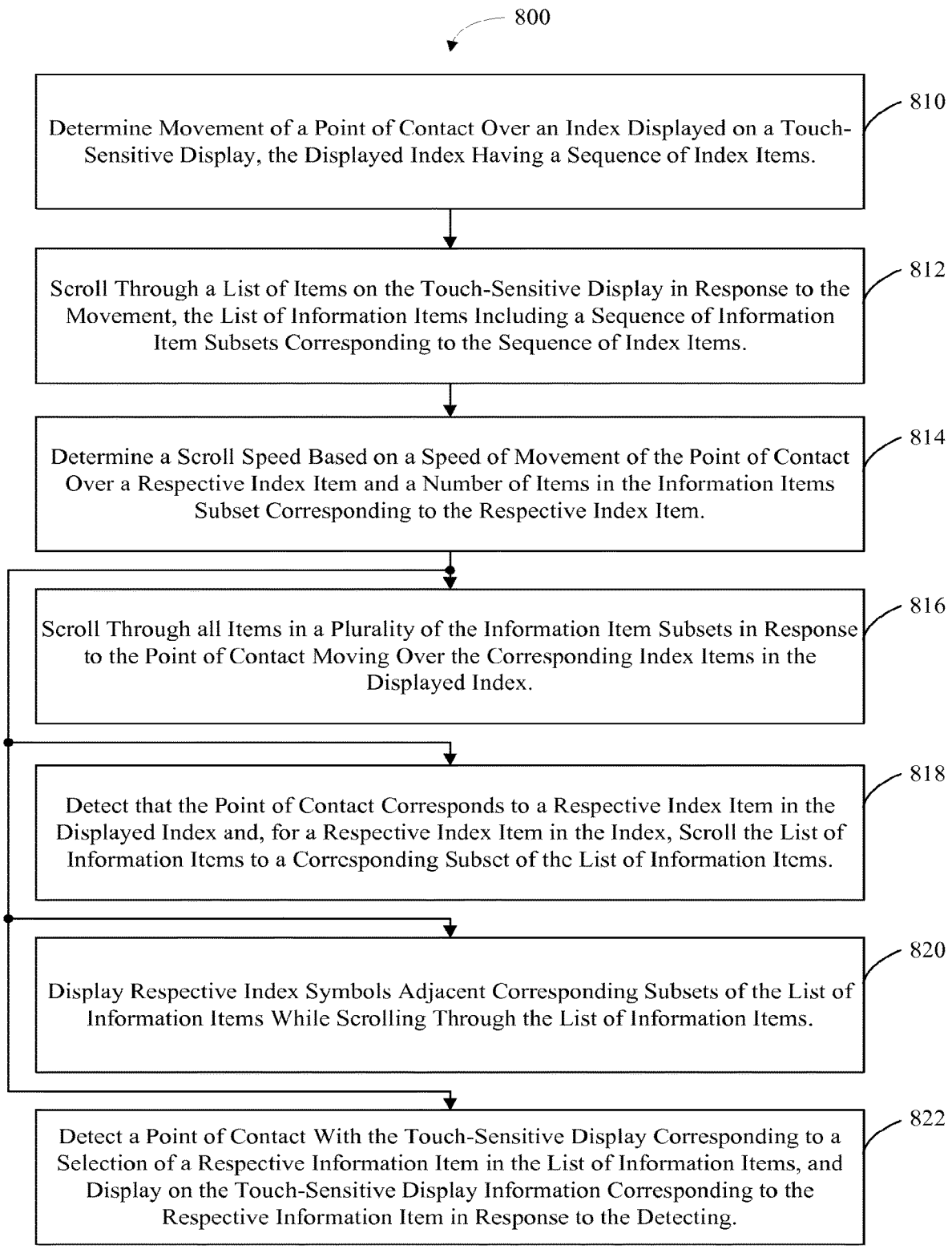
FIG. 8 is a flow diagram illustrating an embodiment of a method of scrolling through list.

Attention is now given to embodiments of an index for the list of items or information items. FIG. 8 is flow diagram illustrating an embodiment of a method 800 of scrolling through a list. Movement of a point of contact over an index displayed on a touch-sensitive display is determined (810). The displayed index may have a sequence of index items. A list of items on the touch-sensitive display is scrolled in response to the user's movement of the point of contact over the index (812). The list of information items may include a sequence of information item subsets corresponding to the sequence of index items. For instance, if the index includes index items A, B, C and D, the sequence of information items may include a subset of items corresponding to index item A, another subset of items corresponding to index item B, another subset of items corresponding to index item C, and yet another subset of items corresponding to index item D. To be even more specific, in one example, each subset of index items contain the same first letter or symbol.

A scroll speed based on the speed of movement of the point of contact over a respective index item and the number of items in the information item subset corresponding to a respective index item may be determined (814). One or more of the following operations may occur. Items in a plurality of the information item subsets may be scrolled through the display, at the determined scroll speed, in response to the point of contact moving over the corresponding index items in the displayed index (816). When the point of contact corresponds to a respective index item in the displayed index, that positioning of the point of contact is detected, and the list of information items is smoothly scrolled to a corresponding subset of the list of information items (818). In some embodiments, respective index symbols may be displayed adjacent to corresponding subsets of the list of information items while scrolling through the list of information items (820). When the point of contact with the touch-sensitive display corresponds to a selection of a respective information item in the list of information items, that positioning of the point of contact is detected, and information corresponding to the respective information item is displayed in response (822). In other embodiments, the method 800 may include fewer operations or additional operations. In addition, two or more operations may be combined and/or an order of the operations may be changed.

Figure 9:
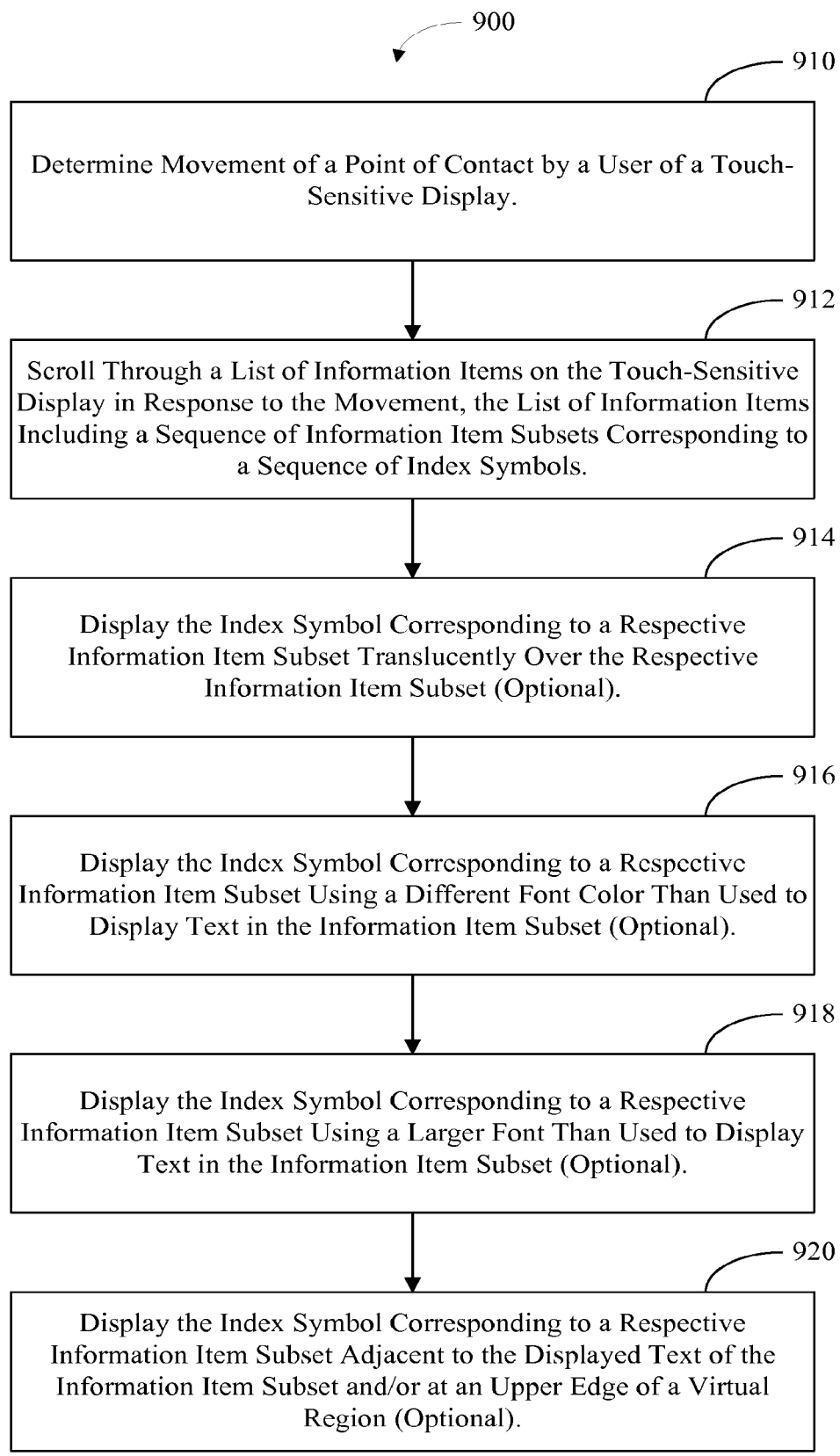
FIG. 9 is a flow diagram illustrating an embodiment of a method of scrolling through a list.

FIG. 9 is a flow diagram illustrating an embodiment of a method 900 of scrolling through a list. Movement of a point of contact by a user of a touch-sensitive display is determined (910). A list of information items on the touch-sensitive display is scrolled in response to the movement (912). The list of information items may include a sequence of information item subsets corresponding to a sequence of index symbols. In some embodiments, the index symbol corresponding to a respective information item subset is displayed translucently over the respective information item subset (914). The index symbol corresponding to a respective information item subset may be optionally displayed using a different font color than used to display text in the information item subset (916). The index symbol corresponding to a respective information item subset may be optionally displayed using a larger font than used to display text in the information item subset (918). The index symbol corresponding to a respective information item subset may be optionally displayed adjacent to the displayed text of the information item subset and/or at an upper edge of a virtual region (920). In other embodiments, the method 900 may include fewer operations or additional operations. In addition, two or more operations may be combined and/or an order of the operations may be changed.

Figure 10:
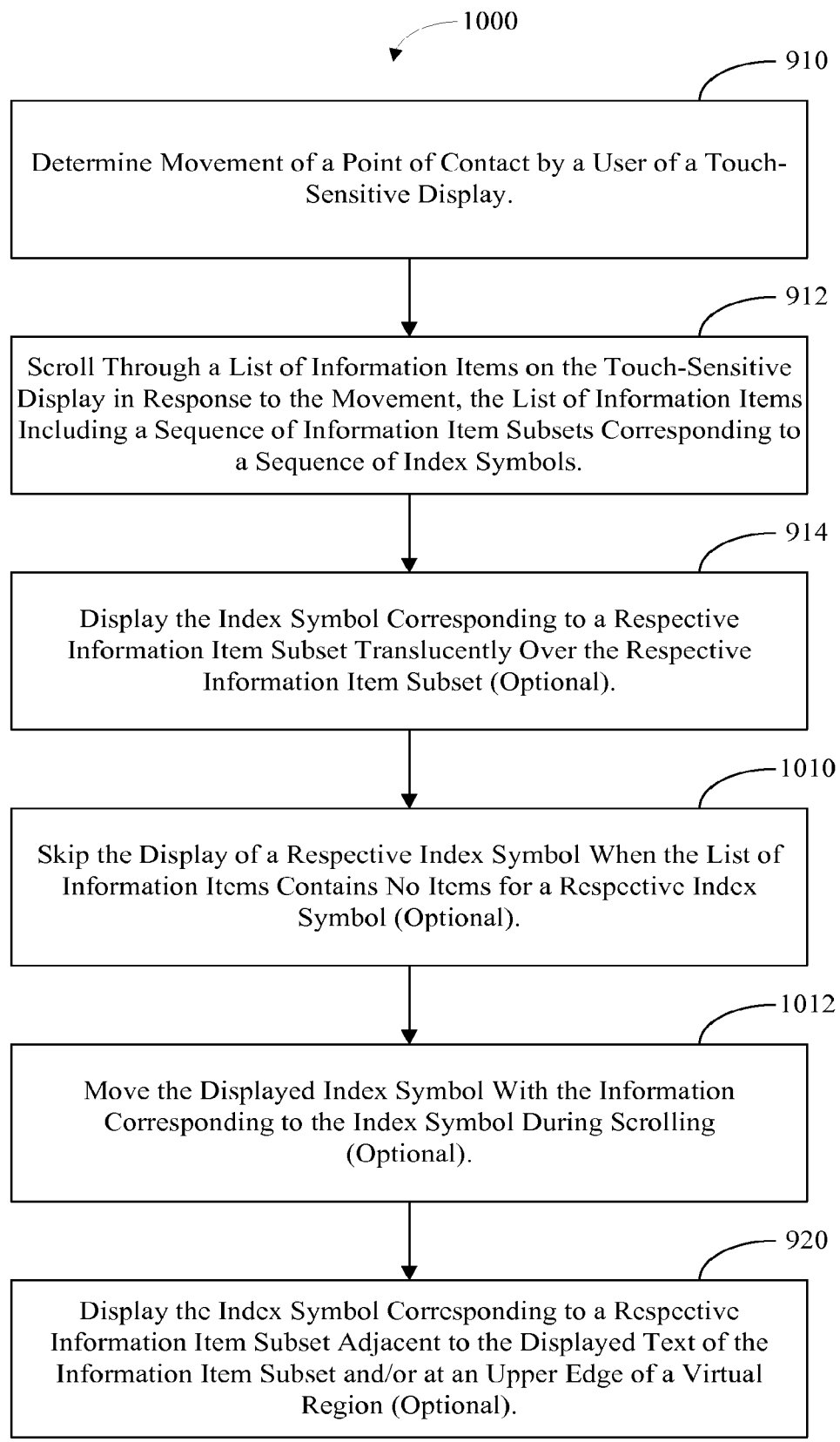
FIG. 10 is a flow diagram illustrating an embodiment of a method of scrolling through a list.

FIG. 10 is a flow diagram illustrating an embodiment 1000 of a method of scrolling through a list. Movement of a point of contact by a user of a touch-sensitive display is determined (910). A list of information items on the touch-sensitive display is scrolled in response to the movement (912). The list of information items may include a sequence of information item subsets corresponding to a sequence of index symbols. The index symbol corresponding to a respective information item subset may be optionally displayed translucently over the respective information item subset (914). The display of a respective index symbol may be skipped when the list of information items contains no items for a respective index symbol (1010). The displayed index symbol may be optionally moved with the information corresponding to the index symbol while the list is scrolled (1012). The index symbol corresponding to a respective information item subset may be optionally displayed adjacent to the displayed text of the information item subset and/or at an upper edge of a virtual region (920). In other embodiments, the method 1000 may include fewer operations or additional operations. In addition, two or more operations may be combined and/or an order of the operations may be changed.

Figure 11A:
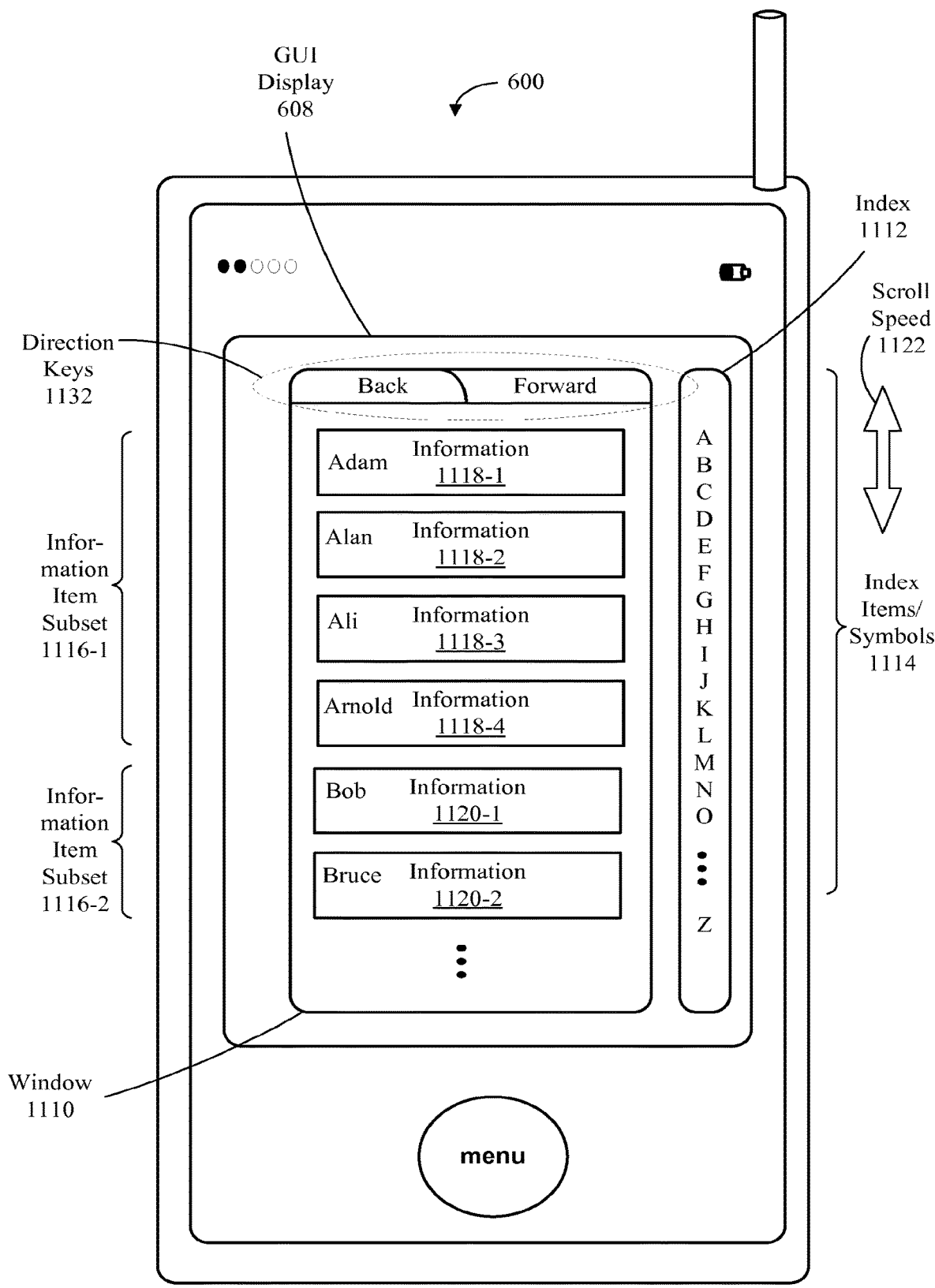
FIG. 11A is a schematic diagram illustrating an embodiment of a user interface of a portable electronic device having a touch-sensitive display.

FIG. 11A is a schematic diagram illustrating an embodiment of a user interface of a portable electronic device 600 having a touch-sensitive display 608. The display 608 may include a window 1110 containing a plurality of objects corresponding to a list of information items, such as information objects 1118 and 1120. The information objects 1118 and 1120 may be part of an alphabetically ordered list e.g., arranged according to the first and/or the last name). The information objects 1118 and 1120 may be grouped into information item subsets 1116, for example, each information item subset 1116 may be based on one or more letters of the alphabet.

The display 608 may also include an index 112 in a separate window. The index 1112 may include a sequence of index items or index items/symbols 1114, such as letters of the alphabet. The index 1112 may be used to scroll through the information item subsets 1116. Motion of a point of contact with the display 608 over the index 1112 results in scrolling through the information item subsets 1116. In some embodiments, the information items are scrolled at a speed 1122 that is based both on the speed, velocity and/or acceleration of movement of the point of contact and the number of items in the information item subsets corresponding to the index items over which the point of contact moves.

In some embodiments, if the user moves the point of contact to a respective index item/symbol in the index 1112, the list of information items is quickly and smoothly scrolled to the corresponding information item subset. In some other embodiments, if the user makes a point over contact over a respective index item/symbol, items from the corresponding information item subset are displayed, i.e., there may be a jump to that subset of the information items.

If the user makes a point of contact, i.e., touches the display 608, over one of the information items, such as information 1118-1, corresponding contact information may be displayed in a the window 1110. The user may also change to or from viewing such contact information using the forward and back navigation keys 1132.

Figure 11B:
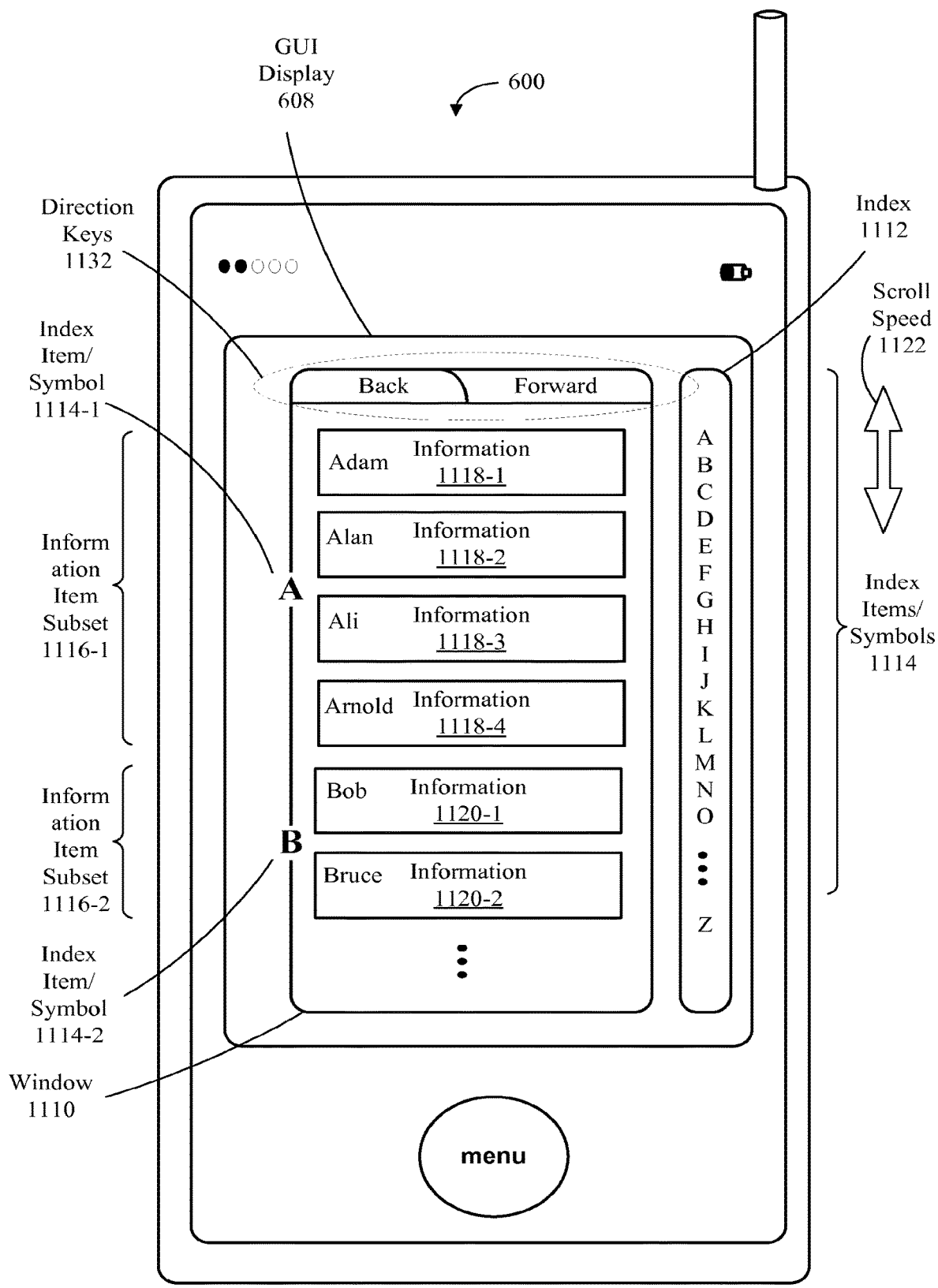
FIG. 11B is a schematic diagram illustrating an embodiment of a user interface of a portable electronic device having a touch-sensitive display.
Figure 11C:
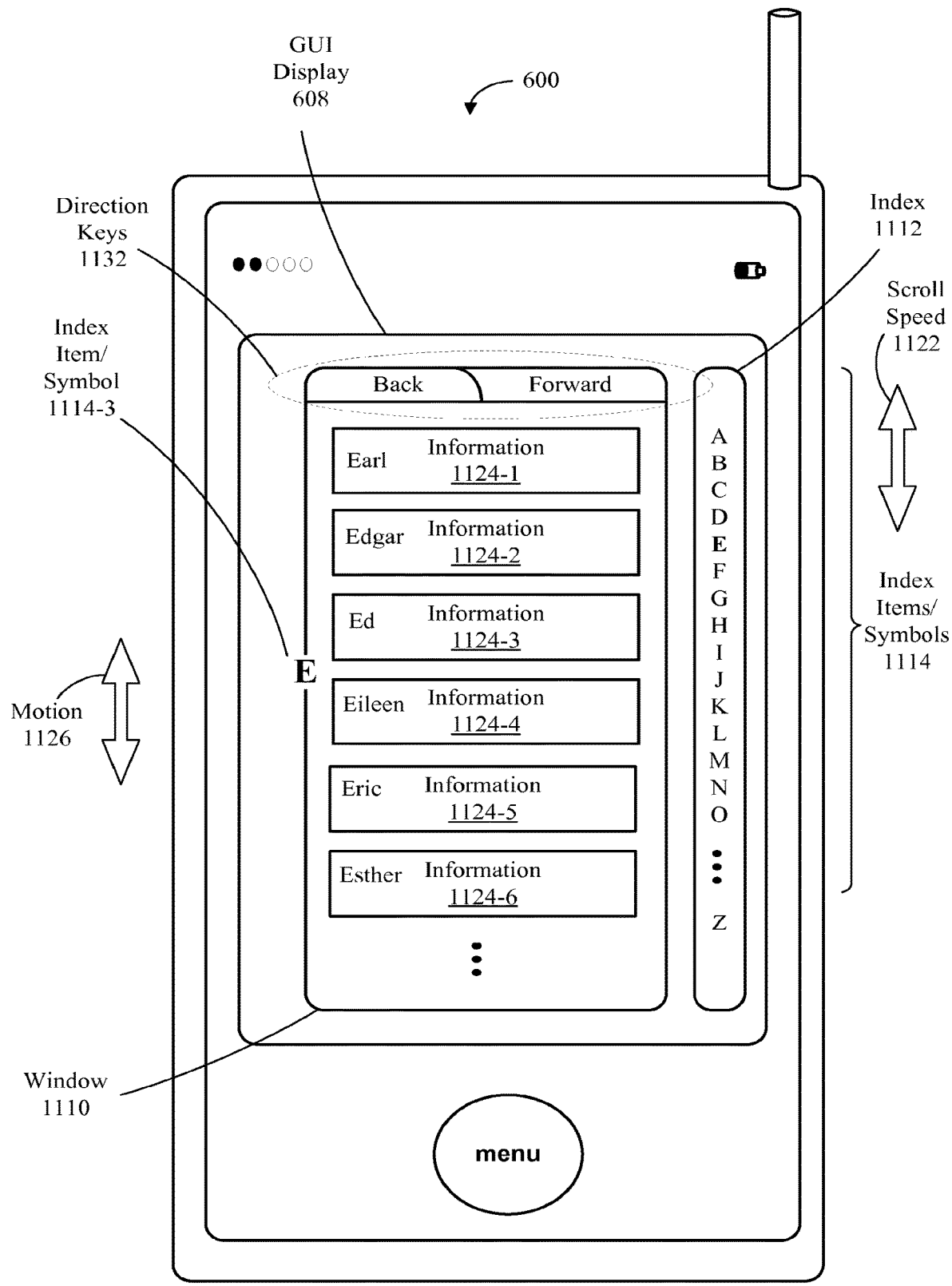
FIG. 11C is a schematic diagram illustrating an embodiment of a user interface of a portable electronic device having a touch-sensitive display.
Figure 11D:
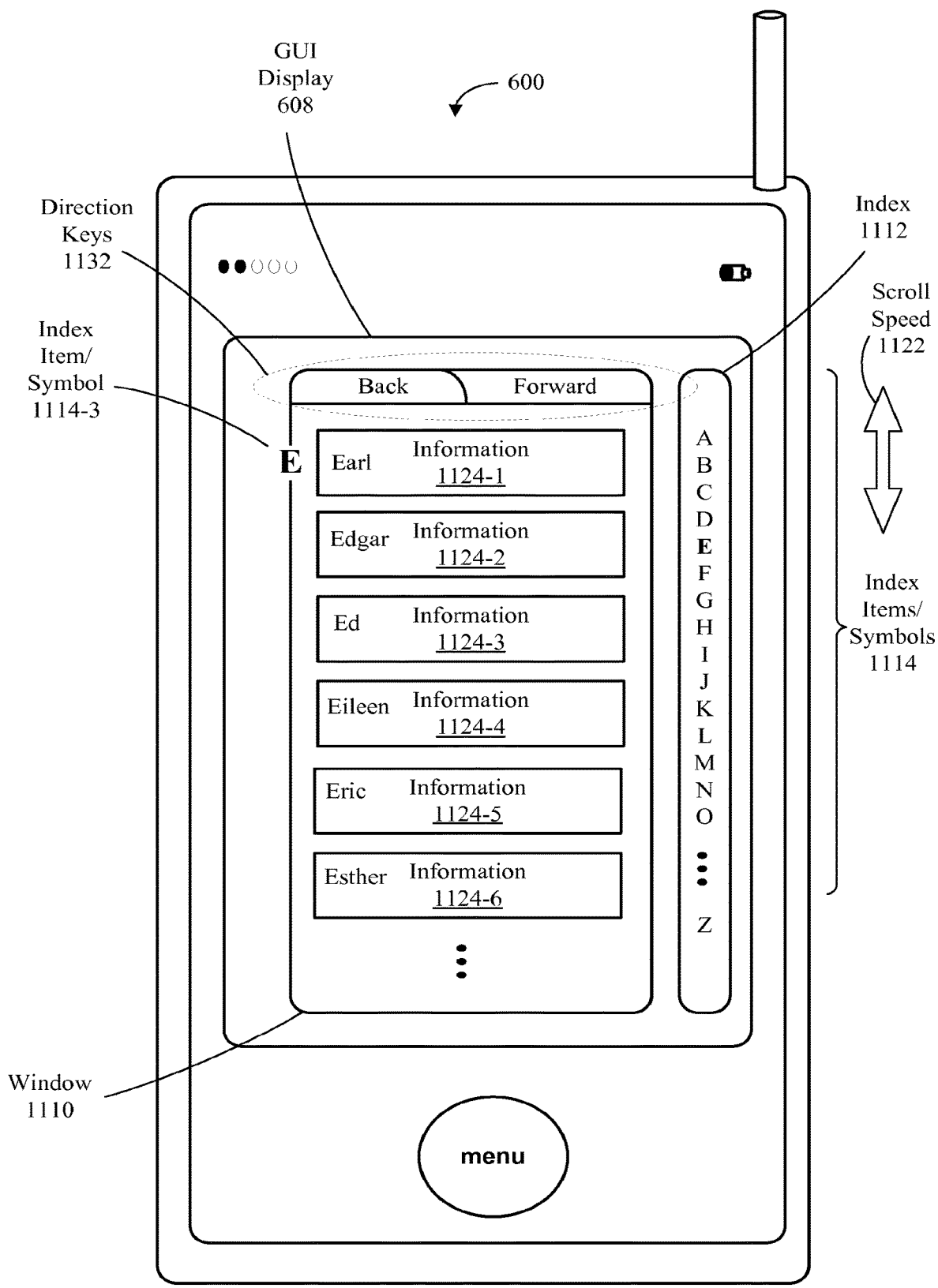
FIG. 11D is a schematic diagram illustrating an embodiment of a user interface of a portable electronic device having a touch-sensitive display.

In some embodiments, index symbols may be displayed in an index 1112, and also adjacent to corresponding subsets of information items. Several implementations are illustrated in FIGS. 11B-11D. In FIG. 11B index items/symbols 1114-1 and 1114-2 are displayed adjacent to corresponding information items subsets 1116-1 and 1116-2. As the list of information items is scrolled, the index items/symbols 1114-1 and 1114-2 may move up and/or down in conjunction with the information 1118 and 1120. The index items/symbols 1114-1 and 1114-2 may be translucent, use a different font size than the displayed text for the information 1118 and 1120, and/or use a different font color than the displayed text for the information 1118 and 1120.

In some embodiments, an index item/symbol is displayed approximately adjacent to information and at a mid-point of the window 1110. As illustrated in FIG. 11C, index item/symbol 1114-3 is displayed adjacent to information 1124 and at a mid-point of the window 1110. The index item/symbol 1114-3 may move up and down about the mid-point during scrolling of the list of information items. In other embodiments, the index item/symbol 1114-3 may be displayed at or near an upper edge of the window 1110, as illustrated in FIG. 11D. In other embodiments, the index item/symbol 1114 may be displayed at or near an upper edge of the window 1110 in a banner.

The index item/symbol 1114-3 may remain adjacent to a first displayed item of a respective information item subset. When scrolling up through the list of information items (e.g., in response to an upward swipe on the touch sensitive display by the user), the index item/symbol 1114-3 may move from a lower edge of the window to the upper edge of the window 1110. As the scrolling continues, the index item/symbol 1114-3 may remain there until the end of the respective information item subset is reached, at which time the index item/symbol 1114-3 may be replaced with a subsequent index item/symbol.

When scrolling down through the list of information items e.g., in response to an downward swipe on the touch sensitive display by the user), the index item/symbol 1114-3 may remain at the upper edge of the window 1110 until the beginning of the respective information item subset is reached, at which time the index item/symbol 1114-3 may scroll from the upper edge of the window 1110 to the lower edge of the window 1110. Simultaneously, a preceding index item or symbol may be displayed at the upper edge of the window 1110.

Figure 11E:
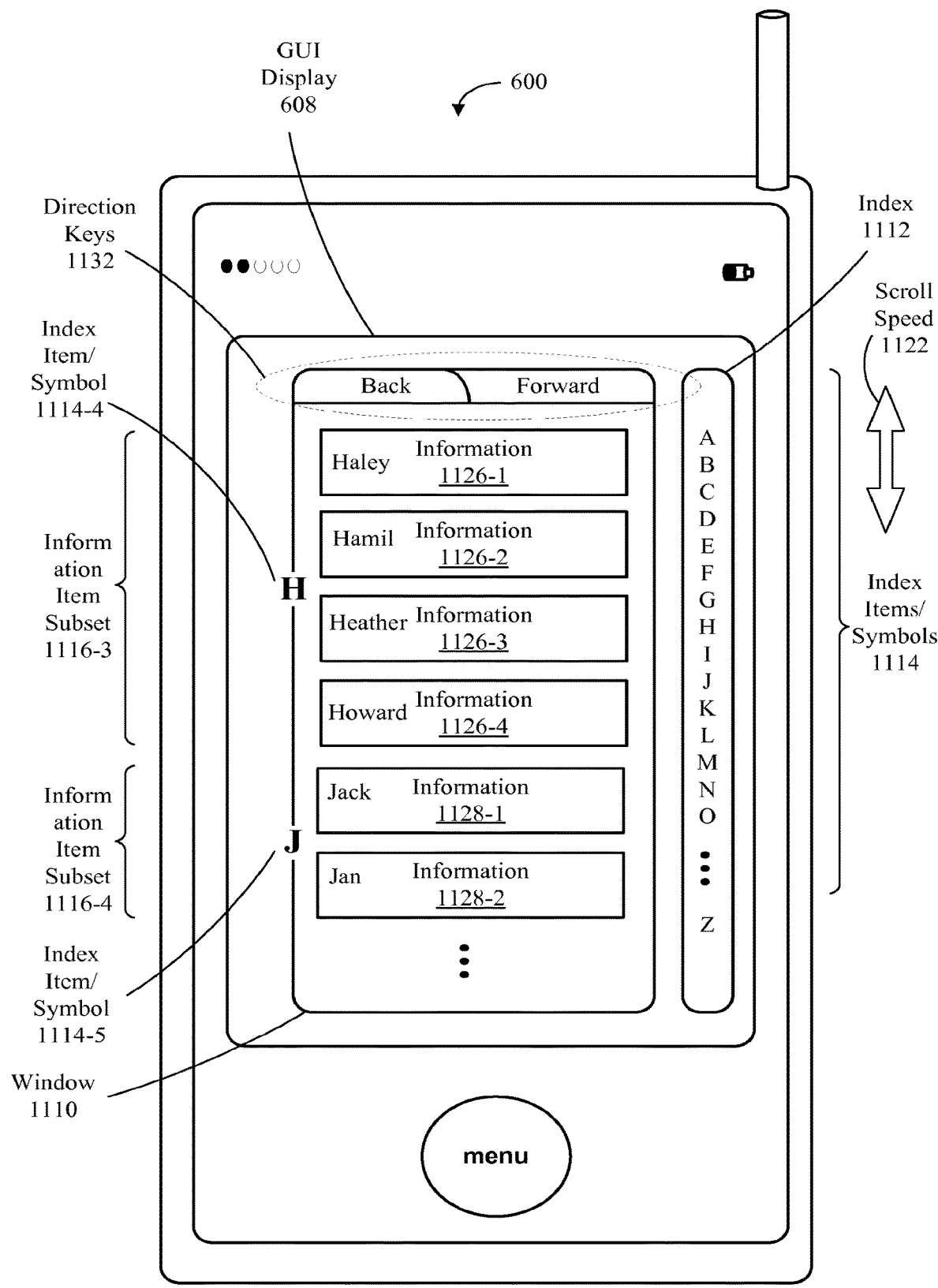
FIG. 11E is a schematic diagram illustrating an embodiment of a user interface of a portable electronic device having a touch-sensitive display.

In some embodiments, one or more of the index item/symbols 1114 may not be displayed, i.e., may be skipped, if the corresponding one or more of the information item subsets 1116 are empty, i.e., do not contain any information entries. This is illustrated in FIG. 11E, in which an index item/symbol for the letter 'I' has been skipped. Index item/symbols 1114-4 and 1114-5 are displayed since there is corresponding information 1126 and 1128.

Figure 12:
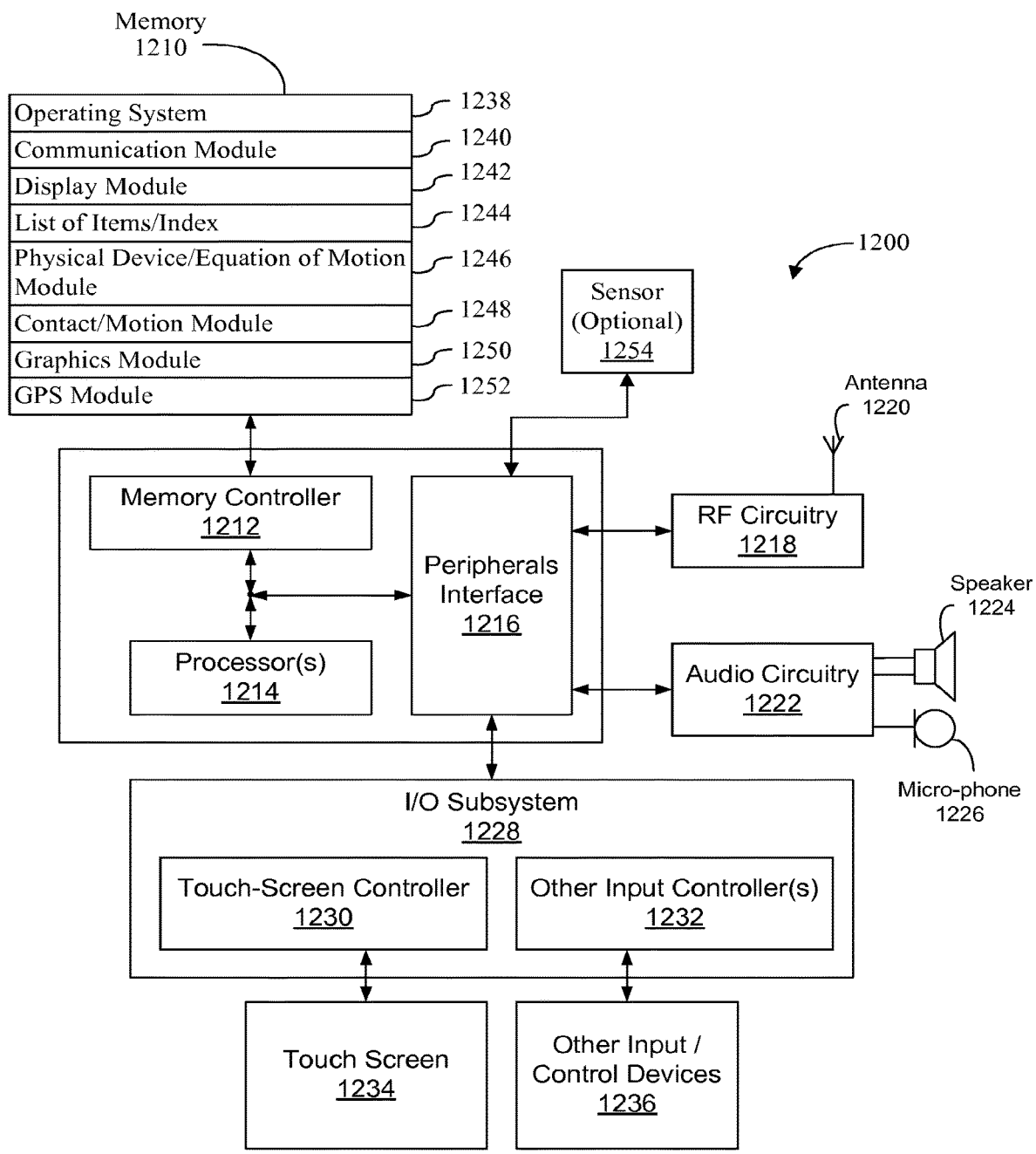
FIG. 12 is a block diagram illustrating an embodiment of a portable electronic device having a touch-sensitive display.

Attention is now directed to embodiments of devices, FIG. 12 is a block diagram illustrating an embodiment of a device 1200, such as a portable electronic device having a touch-sensitive display 1234. The device 1200 may include a memory controller 1212, one or more data processors, image processors and/or central processing units 1214 and a peripherals interface 1216. The memory controller 1212, the one or more processors 1214 and/or the peripherals interface 1216 may be separate components or may be integrated, such as in one or more integrated circuits. The various components in the device 1200 may be coupled by one or more communication buses or signal lines.

The peripherals interface 1216 may be coupled to an optional sensor 1254, such as CMOS or CCD image sensor, RF circuitry 18, audio circuitry 1222 and/or an input/output (I/O) subsystem 1228. The audio circuitry 1222 may be coupled to a speaker 1224 and a micro-phone 1226. The device 1200 may support voice recognition and/or voice replication. The RF circuitry 1218 may be coupled to one or more antennas 1220 and may allow communication with one or more additional devices, computers and/or servers using a wireless network. The device 1200 may support a variety of communications protocols, including code division multiple access (CDMA), global system for mobile communications (GSM), Enhanced Data GSM Environment (EDGE), Wi-Fi (such as IEEE 802.11a, IEEE 802.11b, IEEE 802.11g and/or IEEE 802.11n), Bluetooth, Wi-MAX, a protocol for email, instant messaging, and/or a simple message system (SMS), or any other suitable communication protocol, including communication protocols not yet developed as of the filing date of this document. In an exemplary embodiment, the device 1200 may be, at least in part, a cellular telephone.

The I/O subsystem 1228 may include a touch screen controller 1230 and/or other input controller(s) 1232. The touch-screen controller 1230 may be coupled to a touch-sensitive screen 1234. The touch screen 1234 and touch screen controller 1230 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 1234. The touch-sensitive screen 1234 may have a resolution in excess of 100 dpi. In an exemplary embodiment, the touch screen 1234 has a resolution of approximately 168 dpi. The other input controller(s) 1232 may be coupled to other input/control devices 1236, such as one or more buttons, a keyboard, infrared port, USB port, and/or a pointer device such as a mouse. The one or more buttons (not shown) may include an up/down button for volume control of the speaker 1224 and/or the micro-phone 1226. The one or more buttons (not shown) may include a push button. A quick press of the push button (not shown) may disengage a lock of the touch screen 1234. A longer press of the push button (not Shown) may turn power to the device 1200 on or off. The user may be able to customize a functionality of one or more of the buttons. The touch screen 1234 may be used to implement virtual or soft buttons and/or a keyboard.

In some embodiments, the device 1200 may include circuitry for supporting a location determining capability, such as that provided by the global positioning system (GPS). In some embodiments, the device 1200 may be used to play back recorded music, such as one or more files, such as MP3 files or AAC files. In some embodiments, the device 1200 may include the functionality of an MP3 player, such as an iPod (trademark of Apple Computer, Inc.). The device 1200 may, therefore, include a 36-pin connector that is compatible with the iPod.

The memory controller 1212 may be coupled to memory 1210. Memory 1210 may include high-speed random access memory and/or non-volatile memory, such as one or more magnetic disk storage devices, one or more optical storage devices, and/or flash memory. Memory 1210 may store an operating system 1238, such as Darwin, RTXC, LINUX, UNIX, OS X, WINDOWS, or an embedded operating system such as VxWorks. The operating system 1238 may include procedures (or sets of instructions) for handling basic system services and for performing hardware dependent tasks. Memory 1210 may also store communication procedures (or sets of instructions) in a communication module 1240. The communication procedures may be used for communicating with one or more additional devices, one or more computers and/or one or more servers. The memory 1210 may include a display module (or a set of instructions) 1242, a list of items/index 1244, a physical device/equation of motion module (or a set of instructions) 1246 (for governing the scrolling of a list on the display 1234), contact/motion module (or a set of instructions) 1248 to determine the point of contact and/or its movement, a graphics module (or a set of instructions) 1250, and/or a GPS module 1252. The graphics module 1250 may support widgets, i.e., modules or applications with embedded graphics. The widgets may be implemented using JavaScript, HTML, or other suitable languages.

Each of the above identified modules and applications corresponds to a set of instructions for performing one or more functions described above. These modules (i.e., sets of instructions) need not be implemented as separate software programs, procedures or modules. The various modules and sub-modules may be rearranged and/or combined. Memory 1210 may include additional modules and/or sub-modules, or fewer modules and/or sub-modules. Memory 1210, therefore, may include a subset or a superset of the above identified modules and/or sub-modules. Various functions of the device 1200 may be implemented in hardware and/or in software, including in one or more signal processing and/or application specific integrated circuits.

Figure 13:
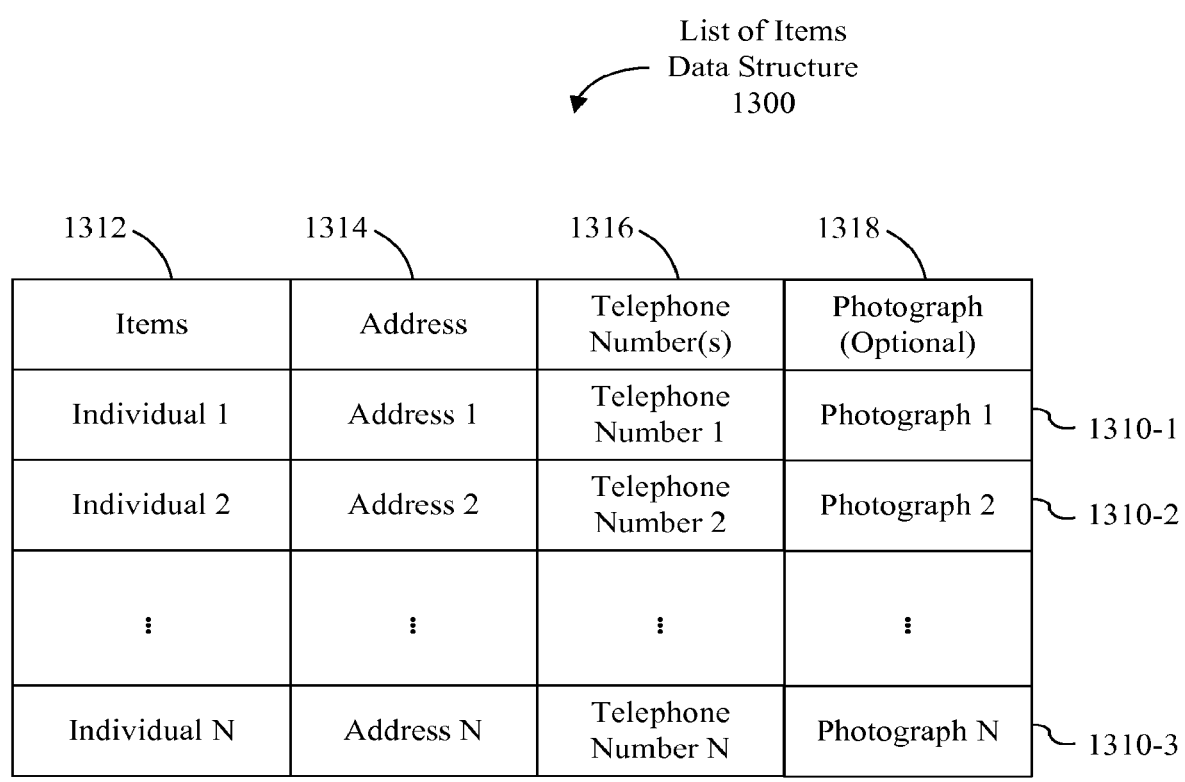
FIG. 13 is a block diagram of an embodiment of a data structure for a list of items.

Attention is now directed towards data structures for implementing the list of items or information items. FIG. 13 is a block diagram illustrating an embodiment of a data structure 1300 for a list of items. The data structure 1300 includes a plurality of item entries 1310. In some embodiments, each item entry 1310 includes an item name or identifier 1312, one or more addresses 1314, one or more telephone numbers 1316, one or more optional photographs 1318, and/or one or more fields with miscellaneous information 1320 about the item.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a touch-sensitive display;
one or more processors;
a memory; and
one or more programs, wherein the one or more programs are stored in the memory and configured to be executed by the one or more processors, the programs including instructions for:
   displaying, on the touch-sensitive display, a user interface that includes:
      a sequence of index items that includes a first index item and a second index item;
      a list of information items that includes a first information item subset that corresponds to the first index item; and
      a first index symbol that corresponds to the first information item subset and is a representation of the first index item;
   while concurrently displaying the first information item subset, the sequence of index items that includes the first index item and the second index item, and the first index symbol, detecting movement of a first point of contact on the touch-sensitive display; and
   in response to detecting movement of the first point of contact on the touch-sensitive display, scrolling through the list of information items on the touch-sensitive display, including while scrolling through the list of information items on the touch-sensitive display and while maintaining display of the sequence of index items that includes the first index item item and the second index item:
      displaying, on the touch-sensitive display, a second information item subset and a second index symbol that were not displayed before scrolling through the list of information items, wherein the second information item subset corresponds to the second index item, and wherein the second index symbol corresponds to the second information item subset and is a representation of the second index item; and ceasing to display the first information item subset and the first index symbol.

2. The device of claim 1, wherein the corresponding index symbol remains adjacent to a first displayed item of a respective information item subset.

3. The device of claim 1, wherein displaying the first index symbol includes displaying the first index symbol in a banner at or near an upper edge of the window.

4. The device of claim 1, wherein the first index symbol is displayed adjacent to displayed text of the first information item subset.

5. The device of claim 1, wherein the one or more programs further include instructions for:

detecting a third point of contact with the touch-sensitive display corresponding to user selection of a respective information item in the list of information items and displaying on the touch-sensitive display information corresponding to the respective information item.

6. The device of claim 1, wherein scrolling through the list of information items accelerates in response to accelerated movement of a fourth point of contact on the touch-sensitive display following breaking of the first point of contact.

7. The device of claim 1, wherein the index symbols include alphabetical index symbols.

8. A method, comprising:

at an electronic device with a touch-sensitive display:
displaying, on the touch-sensitive display, a user interface that includes:
a sequence of index items that includes a first index item and a second index item;
a list of information items that includes a first information item subset that corresponds to the first index item; and
a first index symbol that corresponds to the first information item subset and is a representation of the first index item;
while concurrently displaying the first information item subset, the sequence of index items that includes the first index item and the second index item, and the first index symbol, detecting movement of a first point of contact on the touch-sensitive display; and
in response to detecting movement of the first point of contact on the touch-sensitive display, scrolling through the list of information items on the touch-sensitive display, including while scrolling through the list of information items on the touch-sensitive display and while maintaining display of the sequence of index items that includes the first index item item and the second index item:
displaying, on the touch-sensitive display, a second information item subset and a second index symbol that were not displayed before scrolling through the list of information items, wherein the second information item subset corresponds to the second index item, and wherein the second index symbol corresponds to the second information item subset and is a representation of the second index item; and
ceasing to display the first information item subset and the first index symbol.

9. The method of claim 8, wherein the first index symbol remains adjacent to a first displayed item of the first information item subset.

10. The method of claim 8, wherein displaying the first index symbol includes displaying the first index symbol in a banner at or near an upper edge of the window.

11. The method of claim 8, wherein the first index symbol is displayed adjacent to displayed text of the first information item subset.

12. The method of claim 8, further comprising:
detecting a third point of contact with the touch-sensitive display corresponding to user selection of a respective information item in the list of information items and displaying on the touch-sensitive display information corresponding to the respective information item.

13. The method of claim 8, wherein scrolling through the list of information items accelerates in response to accelerated movement of a fourth point of contact on the touch-sensitive display following breaking of the first point of contact.

14. The method of claim 8, wherein the index symbols include alphabetical index symbols.

15. A non-transitory computer readable storage medium storing one or more programs, the one or more programs comprising instructions, which when executed by an electronic device with a touch-sensitive display, cause the device to:

display, on the touch-sensitive display, a user interface that includes:
a sequence of index items that includes a first index item and a second index item;
a list of information items that includes a first information item subset that corresponds to the first index item; and
a first index symbol that corresponds to the first information item subset and is a representation of the first index item;
while concurrently displaying the first information item subset, the sequence of index items that includes the first index item and the second index item, and the first index symbol, detect movement of a first point of contact on the touch-sensitive display; and
in response to detecting movement of the first point of contact on the touch-sensitive display, scroll through the list of information items on the touch-sensitive display, including while scrolling through the list of information items on the touch-sensitive display and while maintaining display of the sequence of index items that includes the first index item item and the second index item:
display, on the touch-sensitive display, a second information item subset and a second index symbol that were not displayed before scrolling through the list of information items, wherein the second information item subset corresponds to the second index item, and wherein the second index symbol corresponds to the second information item subset and is a representation of the second index item; and
cease to display the first information item subset and the first index symbol.

16. The non-transitory computer readable storage medium of claim 15, wherein the corresponding index symbol remains adjacent to a first displayed item of a respective information item subset.

17. The non-transitory computer readable storage medium of claim 15, wherein displaying the first index symbol includes displaying the first index symbol in a banner at or near an upper edge of the window.

18. The non-transitory computer readable storage medium of claim 15, wherein the first index symbol is displayed adjacent to displayed text of the first information item subset.

19. The non-transitory computer readable storage medium of claim 15, wherein the one or more programs further include instructions for:
  detecting a third point of contact with the touch-sensitive display corresponding to user selection of a respective information item in the list of information items and displaying on the touch-sensitive display information corresponding to the respective information item.

20. The non-transitory computer readable storage medium of claim 15, wherein scrolling through the list of information items accelerates in response to accelerated movement of a fourth point of contact on the touch-sensitive display following breaking of the first point of contact.

21. The non-transitory computer readable storage medium of claim 15, wherein the index symbols include alphabetical index symbols.

\* \* \* \* \*

UNITED STATES PATENT AND TRADEMARK OFFICE
CERTIFICATE OF CORRECTION

PATENT NO. : 10,732,814 B2
APPLICATION NO. : 15/167532
DATED : August 4, 2020
INVENTOR(S) : Bas Ording et al.

Page 1 of 1

It is certified that error appears in the above-identified patent and that said Letters Patent is hereby corrected as shown below:

In the Claims

In Claim 1, Column 14, Line 63, delete "item item" and insert -- item --, therefor.

In Claim 8, Column 15, Line 56, delete "item item" and insert -- item --, therefor.

In Claim 15, Column 16, Line 49, delete "item item" and insert -- item --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*